(12) United States Patent
Regen et al.

(10) Patent No.: US 11,384,849 B2
(45) Date of Patent: Jul. 12, 2022

(54) PINCH VALVE WITH LINEAR SECTIONS

(71) Applicant: SARTORIUS STEDIM BIOTECH GMBH, Göttingen (DE)

(72) Inventors: Thomas Regen, Göttingen (DE); Sebastian Purmann, Göttingen (DE); Swen Weitemeier, Lödingsen (DE); Christian Grimm, Heilbad Heiligenstadt (DE); Lars Böttcher, Melsungen (DE)

(73) Assignee: SARTORIUS STEDIM BIOTECH GMBH, Gottingen (DE)

( * ) Notice: Subject to any disclaimer, the term of this patent is extended or adjusted under 35 U.S.C. 154(b) by 0 days.

(21) Appl. No.: 16/638,525

(22) PCT Filed: Aug. 17, 2018

(86) PCT No.: PCT/EP2018/072315
§ 371 (c)(1),
(2) Date: Feb. 12, 2020

(87) PCT Pub. No.: WO2019/034772
PCT Pub. Date: Feb. 21, 2019

(65) Prior Publication Data
US 2020/0370663 A1   Nov. 26, 2020

(30) Foreign Application Priority Data
Aug. 17, 2017 (EP) ..................................... 17186627

(51) Int. Cl.
*F16K 7/06* (2006.01)
*F16K 27/02* (2006.01)

(52) U.S. Cl.
CPC ................ *F16K 7/06* (2013.01); *F16K 27/02* (2013.01)

(58) Field of Classification Search
USPC ............................................................. 251/4
See application file for complete search history.

(56) References Cited

U.S. PATENT DOCUMENTS 3,498,316 A * 3/1970 Humphrey ................ F16K 7/06
                                                                137/595
3,770,023 A * 11/1973 Rink ....................... F16K 7/061
                                                                138/121

(Continued)

FOREIGN PATENT DOCUMENTS

CH          268933 A       6/1950
EP       0004324 A2      10/1979
(Continued)

OTHER PUBLICATIONS

International Search Report and Written Opinion dated Sep. 19, 2018 by the International Searching Authority for International Application No. PCT/EP2018/072315, filed on Aug. 17, 2018 and published as WO 2019/034772 on Feb. 21, 2019 (Applicant—Sartorius Stedim Biotech GMBH) (Original—11 pages // Translation—10 Pages).

*Primary Examiner* — Daphne M Barry
(74) *Attorney, Agent, or Firm* — Ballard Spahr LLP

(57) ABSTRACT

The invention relates to a pinch valve comprising a valve element (4) with precisely one flow channel (20) that is surrounded by a circumferential wall (21) and has an inlet opening (24), which is designed for connecting a connection member (2) or which adjoins a connection element (2a), at a first end and an outlet opening (25), which is designed for connecting a connection member (2) or adjoins a connection element (2a), at a second end. The valve element (4) additionally has a pair of force transmitting elements (19, 19') or a force transmitting element (19) and a fixing element (26) which are connected to the circumferential wall (21) in a central closing region (18) that is arranged between the inlet opening and the outlet opening. The force transmitting elements (19, 19') or the force transmitting element (19) and the fixing element (26) are arranged at least substantially perpendicularly to the flow direction of the flow channel (20). The circumferential wall (21) consists of an elastic material such that the force transmitting elements (19, 19'), or the force transmitting element (19) and the fixing element (26), can be moved towards each other under the effect of a pressure or tensile force perpendicularly to the flow direction of the flow channel (20). In the absence of a pressure or tensile force acting on a force transmitting element (19, 19'), (Continued)

the circumferential wall (21) has a cross-section which differs from a circle in the central closing region (18). In the cross-section, the circumferential wall (21) surrounds a flow channel (20) surface area which is constant at least substantially over the entire valve element (4). Thus, the average flow speed is at least substantially uniform at all positions along the valve element (4).

15 Claims, 10 Drawing Sheets

(56) References Cited

U.S. PATENT DOCUMENTS

| | | |
|---|---|---|
| 9,365,304 B2 | 6/2016 | Mueller |
| 2002/0070366 A1 | 6/2002 | Hafner et al. |
| 2012/0032098 A1 | 2/2012 | Rozy et al. |
| 2013/0240082 A1 | 9/2013 | Mueller |

FOREIGN PATENT DOCUMENTS

| | | |
|---|---|---|
| EP | 1872035 A2 | 1/2008 |
| EP | 1525138 B1 | 12/2008 |
| EP | 2682652 A1 | 1/2014 |
| FR | 1056327 A | 2/1954 |
| WO | WO-1986/007625 A1 | 12/1986 |
| WO | WO-2006/106485 A2 | 10/2006 |
| WO | WO-2013/064719 A1 | 5/2013 |
| WO | WO-201 5/155661 A1 | 10/2015 |
| WO | PCT/EP2018/072315 | 8/2018 |
| WO | WO-2019/034772 A1 | 2/2019 |

* cited by examiner

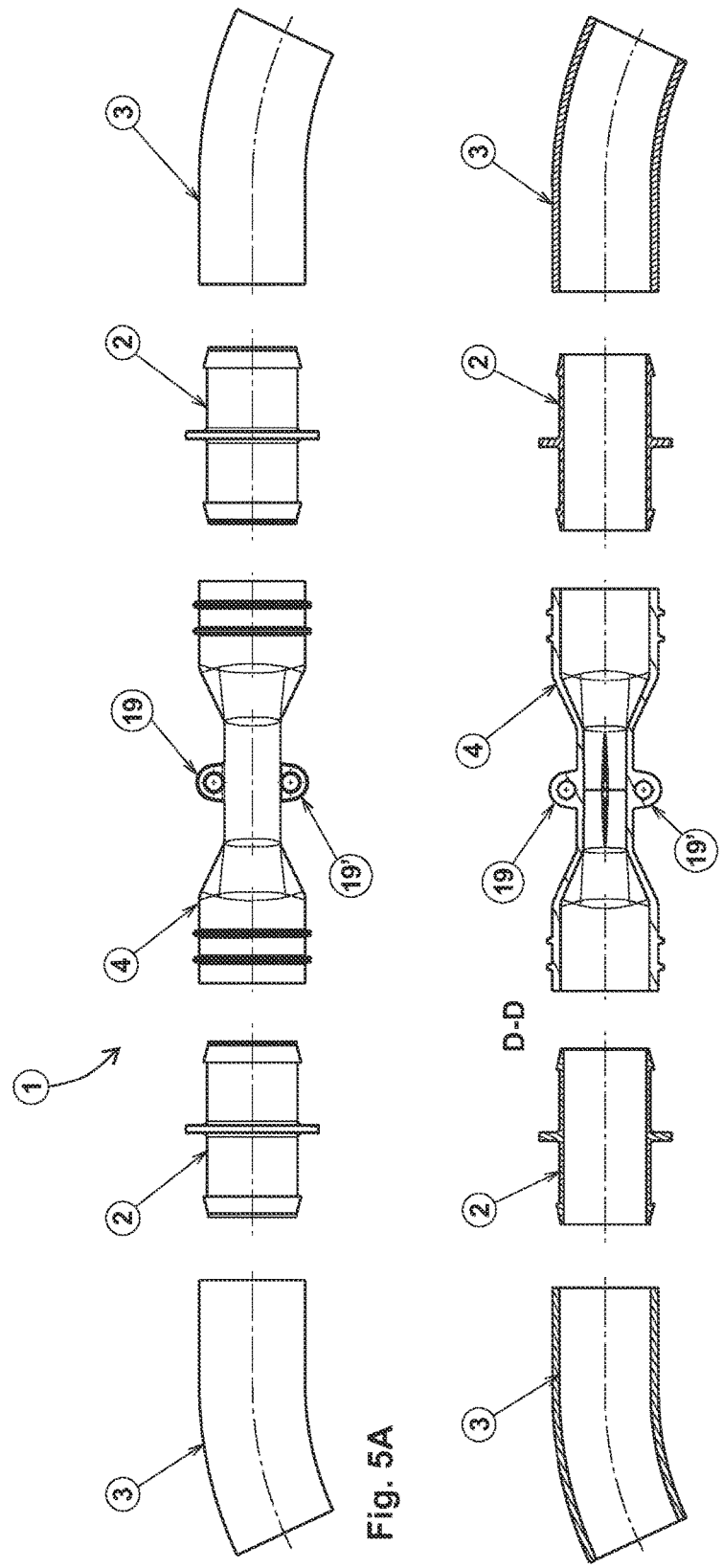
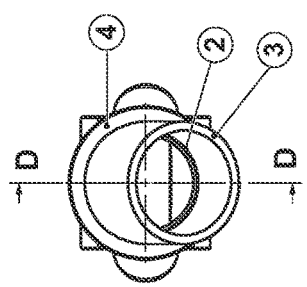

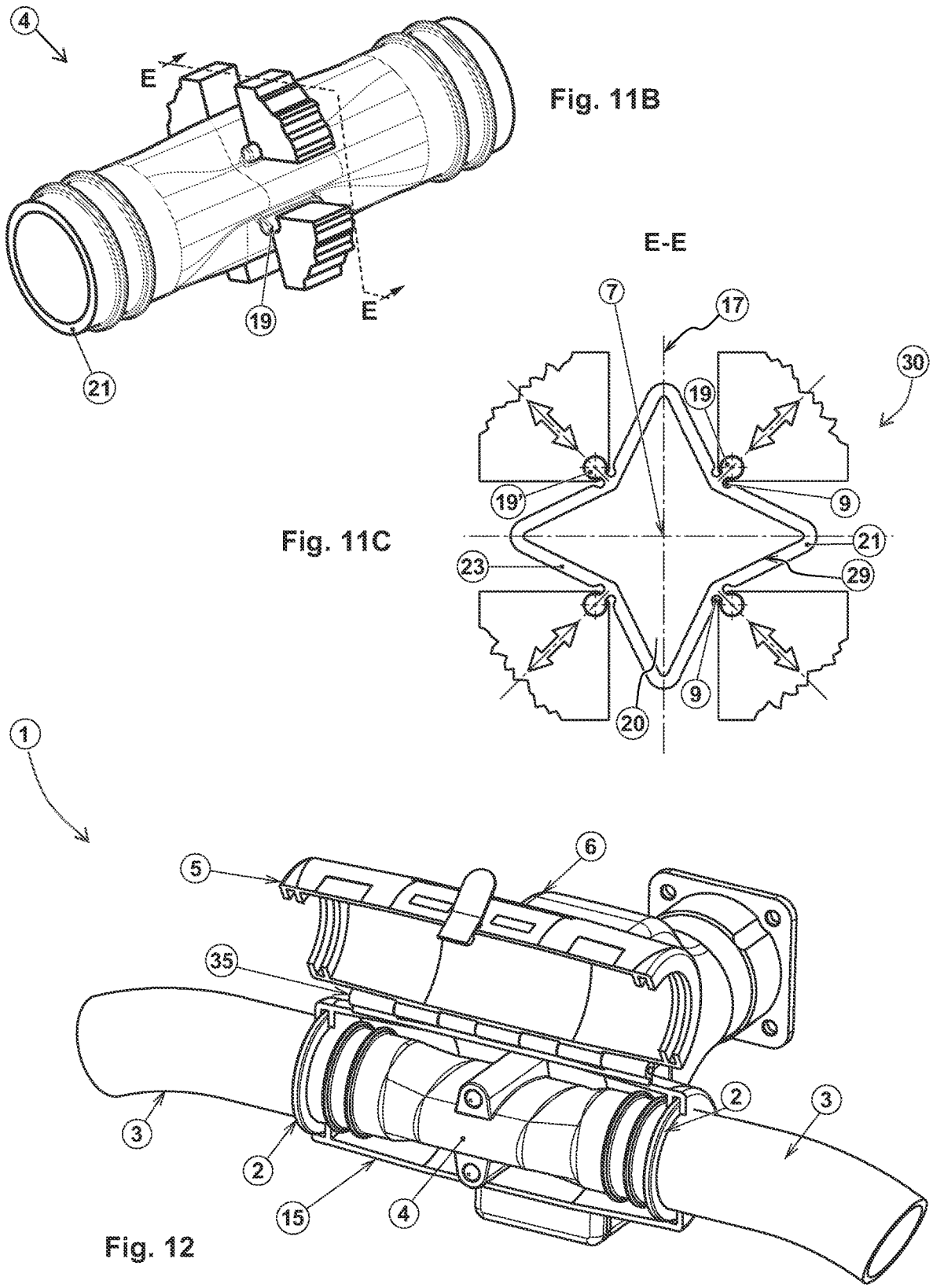

PINCH VALVE WITH LINEAR SECTIONS

CROSS REFERENCE TO RELATED PATENT APPLICATIONS

This application claims the benefit of priority under 35 U.S.C. § 371 of International Application No. PCT/EP2018/072315, filed on Aug. 17, 2018, which claims priority to European Application No. 17186627.0, filed on Aug. 17, 2017. The content of these earlier filed applications is hereby incorporated by reference.

FIELD

Provided is a pinch valve, in particular a pinch valve for regulating the flow of a fluid through a hose.

BACKGROUND

In recent years, the biopharmaceutical industry has increasingly used single-use components. These are no longer only used in the field of product and process development, but also in the field of clinical trial manufacturing for the approval process and even in commercial GMP manufacturing of pharmaceuticals. An illustrative example of a process step relevant in the biopharmaceutical industry is ultra-/diafiltration for volume reduction in the form of cross-flow filtration, also known as tangential-flow filtration. In contrast to continuous-flow filtration, in cross-flow filtration the liquid to be filtered is guided parallel to the filter membrane at high flow velocity, so that cake formation is avoided. The retentate remains in the pump circuit and is concentrated.

An important parameter for controlling this process step is the so-called transmembrane pressure, being the pressure difference between the permeate side and the retentate side. To set this value, pressure and flow rate need to be adjustable. In most cases, this is achieved using a pump in combination with a control valve. If disposable components are used, this can be done either using so-called pinch valves or using diaphragm control valves.

A pinch valve generally contains an elastic piece of tubing through which the filling fluid flows. The elastic piece of tubing is typically located in a fixed housing. By applying a pressure perpendicular to the direction of flow of the filling fluid, the elastic piece of hose is deformed into a lip shape and closed, so that the flow of fluid through the pinch valve is stopped. The pressure can be generated by a fluid such as a gas or by another actuating means. An example of a pinch valve is disclosed in European patent application EP 2 682 652 A1. This embodiment of a pinch valve includes two diametrically opposed punch members that can be mechanically moved towards each other.

A diaphragm valve includes a valve body with an inlet and an outlet, a diaphragm and a sealing bar. The sealing bar is moved towards the membrane. In order to fully open the valve, the diaphragm only needs to be slightly deformed. In addition, there are valves which, instead of the bar, contain a deep seat on which the membrane closes the valve. However, such valves—some of which are used in the field of waste water, paper production or fertilizer production—cannot be classified as diaphragm valves in the sense of the standardization.

SUMMARY

A pinch valve disclosed herein combines the flexibility and flow geometry of a pinch valve in the field of single-use with the control performance of a diaphragm valve. This allows optimized process control with little undesired shear force.

In a first aspect there is provided a pinch valve. The pinch valve includes a valve body and a first and a second force transmitting member, or a force transmitting member and a fixing member. The valve body includes exactly one flow channel, which is circumferentially surrounded by a peripheral wall. The flow channel of the valve body includes a first end and a second end. At the first end there is arranged an inlet opening. The inlet opening may be adapted for the connection of a connecting member. The inlet opening may also be abutting a connecting element or a connecting member. The connecting member, or the connecting element, may for example be designed for connecting a pipe or a hose. At the second end there is arranged an outlet opening. The outlet opening may be adapted for the connection of a connecting member. The outlet opening may also be abutting a connecting member. The connecting member, or the connecting element, may for example be designed for connecting a pipe or a hose. The first and the second force transmitting member, or the force transmitting member and the fixing member, are connected to the circumferential wall of the flow channel in a central closing region. This central closing region is arranged between the inlet opening and the outlet opening. The first and the second force transmitting member, or the force transmitting member and the fixing member, are connected to the circumferential wall in such a way that the force transmitting members, or the force transmitting member and the fixing member, respectively, are arranged at least essentially perpendicular to the flow direction of the flow channel. The circumferential wall consists of an elastic or yieldable material. If a compressive or tensile force acts on a force transmitting member, then this force transmitting member is moveable perpendicularly to the flow direction of the flow channel. Therefore, if a compressive or tensile force acts on a force transmitting member, the first and the second force transmitting member, or the force transmitting member and the fixing member, are moveable relative to one another perpendicular to the flow direction of the flow channel. In the central closing region the circumferential wall surrounding the flow channel has a cross section that is different from a circle. The circumferential wall of the valve body in cross section encloses an area of the flow channel that is at least essentially constant along the entire valve body. As a result, the mean flow velocity in the flow channel is at least essentially uniform or constant at all positions along the valve body.

The first and second force transmitting member, or the force transmitting member and the fixing member, are generally provided as integral parts of the circumferential wall in one piece.

In typical embodiments, the pinch valve is in an open state as long as no compressive or tensile force acts on one or more force transmitting members. The preceding definition of the pinch valve according to the first aspect relates to a corresponding open state of the pinch valve. In such an open state, the circumferential wall has in the central closing region a cross section that is different from a circle.

When a compressive force acts on one or more force transmitting members, the pinch valve is convertible from this open state into a closed state. In this closed state, inner surfaces of linear sections of the circumferential wall in cross section contact each other so completely at the position of the circumferential wall at which the force transmitting members are connected to the same, that in this cross section—that is at the position at which the force transmitting members are connected to the peripheral wall—the flow channel is completely closed.

In some embodiments of the pinch valve, the circumferential wall that surrounds the flow channel has a cross section in the central closing region that is oval in shape. In some embodiments, the pinch valve is in an open state in which the circumferential wall that surrounds the flow channel has a cross section in the central closing region that is oval in shape.

In some embodiments of the pinch valve, the circumferential wall at the position of the central closing region where the force transmitting members or the force transmitting member and the fixing member are connected to the peripheral wall has a cross section which contains two sections defining inner surfaces that are at least substantially mating, i.e. at least substantially accurately fitting. These at least substantially accurately fitting inner surfaces are contactable with one another over their entire surface when a compressive force acts on a force transmitting member.

In some embodiments of the pinch valve, the peripheral wall at the position of the central closing region where the force transmitting members or the force transmitting member and the fixing member are connected to the circumferential wall that surrounds the flow channel has a cross section that contains a plurality of linear sections. A respective linear section in the cross section of the circumferential wall may be an area in which a force transmitting member or a fixing member is connected to the circumferential wall. In some embodiments, two linear sections abut from both sides on a point in the cross section of the circumferential wall at which a force transmitting member or a fixing member is connected to the circumferential wall.

In some embodiments, the pinch valve includes a valve body and a pair of force transmitting members. As already indicated above, the valve body has only a single flow channel which is surrounded by a circumferential wall. The flow channel of the valve body includes a first end and a second end. At the first end there is the inlet opening. As already indicated above, the inlet opening may be designed for the connection of a connecting member. The inlet opening may also abut on a connecting member. The connecting member, or the connecting element, may for example be designed for connecting a pipe. At the second end there is the outlet opening. The outlet opening may be designed for the connection of a connecting member. The outlet opening may also abut on a connecting member. The connecting member, or the connecting element, may for example be designed for connecting a pipe. The pair of force transmitting members is connected to the circumferential wall of the flow channel in a central closing region. This central closing region is arranged between the inlet opening and the outlet opening. The pair of force transmitting members is connected to the circumferential wall in such a way that the force transmitting members are arranged at least essentially perpendicular to the flow direction of the flow channel. The circumferential wall consists of an elastic or yieldable, e.g. flexible material. If a compressive or tensile force acts on the force transmitting members, then the same are moveable against each other in this way perpendicular to the flow direction of the flow channel. Force transmitting members may be moveable against each other along a linear path. The circumferential wall that surrounds the flow channel has in the central closing region a cross section which is different from a circle. In this cross section the circumferential wall surrounds an area of the flow channel which is at least essentially constant not only over the entire central closing region but also over the entire valve body, see above. At the position of the central closing region where the force transmitting members are connected to the circumferential wall which surrounds the flow channel, the circumferential wall has a cross section that includes a plurality of linear sections. A respective linear section in the cross section of the circumferential wall is either an area in which a force transmitting member is connected to the circumferential wall, or two linear segments are adjacent on both sides on a point in the cross section of the circumferential wall at which a force transmitting member is connected to the circumferential wall.

In some embodiments of the pinch valve, the cross section of the circumferential wall includes, at the position where the force transmitting members or the force transmitting member and the fixing member are connected to the peripheral wall, two linear sections facing each other. In some embodiments, the cross section of the circumferential wall includes, at the position where the force transmitting members are connected to the circumferential wall, a plurality of linear sections, at least two of which are arranged at an angle to one another.

In some embodiments of the pinch valve, the cross section of the circumferential wall has a central plane of mirror symmetry at the position where the force transmitting members or the force transmitting member and the fixing member are connected to the circumferential wall. Such a central plane of mirror symmetry may, for example, be aligned horizontally or vertically. In some such embodiments, one or more force transmitting members may be moveable in the direction toward the central plane of mirror symmetry or in the direction away from the central plane of mirror symmetry upon the action of a compressive or tensile force. As an example, in embodiments with a plurality of force transmitting members, some force transmitting members may be moveable in the direction toward the central plane of mirror symmetry or in the direction away from the central plane of mirror symmetry. In some such embodiments, all force transmitting members may also be moveable in the direction toward the central plane of mirror symmetry or in the direction away from the central plane of mirror symmetry.

In some embodiments of the pinch valve, the cross section of the circumferential wall includes an axis of symmetry at the position where the force transmitting members—or the force transmitting member and the fixing member—are connected to the circumferential wall. This axis of symmetry is defined by the fact that the respective cross section of the circumferential wall at the position where the force transmitting members—or the force transmitting member and the fixing member—are connected to the circumferential wall, is transferrable into an arrangement that is indistinguishable from the initial position by a mental rotation through an angle of less than 360° around the axis of symmetry. In some such embodiments, a force transmitting member may be moveable parallel to the plane of mirror symmetry or in the plane of mirror symmetry when subjected to a compressive or tensile force. In some embodiments, force transmitting members of a plurality of force transmitting members may be moveable against one another parallel to the plane of mirror symmetry or in the plane of mirror symmetry upon exposure of the same to a compressive or tensile force. In some embodiments, one or more force transmitting members may be moveable in the direction towards the axis of symmetry or away from the axis of symmetry upon exposure of the same to a compressive or tensile force. As an example, in embodiments with a plurality of force transmitting members, some force transmitting members may be moveable in the direction towards the axis of symmetry or away from the axis of symmetry. In some of these embodiments, all force transmitting members may also be moveable in the direction towards the axis of symmetry or away from the axis of symmetry.

In some embodiments of the pinch valve, the cross section of the circumferential wall includes, at the position where the force transmitting members, or the force transmitting member and the fixing member, are connected to the circumferential wall, both a central plane of mirror symmetry and an axis of symmetry.

In some embodiments of the pinch valve, in which the cross section of the circumferential wall has a central plane of mirror symmetry at the position where the force transmitting members or the force transmitting member and the fixing member are connected to the circumferential wall, a first and a second force transmitting member are moveable relative to each other with respect to the plane of mirror symmetry. In such embodiments, in the central closing region the circumferential wall is deformable in such a way that the distance between the force transmitting members changes when they are moved against each other. In some embodiments in which the cross section of the circumferential wall has a central plane of mirror symmetry at the position where the force transmitting members, or the force transmitting member and the fixing member, are connected to the peripheral wall, a force transmitting member is moveable relative to the fixing member with respect to the plane of mirror symmetry. In such embodiments, in the central closing region the circumferential wall is deformable in such a way that the distance between the force transmitting member and the fixing member changes when the force transmitting member is moved relative to the fixing member.

In some embodiments of the pinch valve, the circumferential wall may in cross section include a plurality of points of reduced wall thickness at the position where the force transmitting members, or the force transmitting member and the fixing member, are connected to the circumferential wall. In some embodiments, the circumferential wall may in cross section include a plurality of segments of reduced wall thickness at the position where the force transmitting members, or the force transmitting member and the fixing member, are connected to the peripheral wall.

In some embodiments of the pinch valve, the circumferential wall of the flow channel in cross section includes one or more thickenings extending at an angle in respect of the cross section, for example in the form of thin elastically deformable surface elements. In some embodiments, the circumferential wall includes one or more indentations extending at an angle in respect of the cross section. In some embodiments, the peripheral wall includes both one or more thickenings extending at an angle in respect of the cross section and one or more indentations extending at an angle with respect to the cross section. Respective thickenings or indentations may allow an as linear deformation of the circumferential wall as possible in the cross section in the central closing region upon exposure to a force via the force transmitting member(s). Such thickenings or indentations may thus allow an as linear deformation of the peripheral wall in the cross section as possible at the position where the force transmitting members, or the force transmitting member and the fixing member, are connected to the peripheral wall.

In some embodiments of the pinch valve, a force transmitting member may be defined by a coupling element for a force transmitting device. In some embodiments of the pinch valve, a force transmitting member may be defined by a punch.

In some embodiments of the pinch valve, a force transmitting member may be couplable to a force transmitting device via a positive, form-locking or a non-positive, friction-type connection. In some embodiments of the pinch valve, a force transmitting member may be fixable to a force-transmitting device by means of a form-locking or a friction-type connection. In some embodiments of the pinch valve, each of the force transmitting members present may be independently couplable and/or fixable to a force transmitting device via a form-locking or a friction-type connection, or may be defined by a punch.

In some embodiments of the pinch valve, a force transmitting member may be connected to a linear segment of the cross section of the circumferential wall. In some embodiments, a plurality of force transmitting members may each be independently connected to a linear segment of the cross section of the circumferential wall. In some embodiments, force transmitting members may be connected to a segment of the cross section of the circumferential wall that defines a corner of the same, for example the corner of a polygon. Such a segment of the cross section of the circumferential wall may define a corner of an n-sided segment. In this case n is a number from 3 to 12, for example a number from 3 to 8. n may also be a number from 3 to 7.

At the position at which the force transmitting members, or the force transmitting member and the fixing member, are connected to the circumferential wall, the cross section of the circumferential wall may in some embodiments of the pinch valve include at least one semicircular, at least one semi-elliptical, at least one parabolic or at least one polygonal segment. In some embodiments, a force transmitting member may be connected to the circumferential wall at a semi-circular, at a semi-elliptical, at a parabolic or at a polygonal segment. In some embodiments, a force transmitting member may be connected to the circumferential wall at a segment of the cross section that is different from a semicircular, a semi-elliptical, a parabolic and/or a polygonal segment. In some embodiments, a fixing member may be connected to the circumferential wall at a semicircular, at a semi-elliptical, at a parabolic or at a polygonal segment. In some embodiments, a fixing member may be connected to the circumferential wall at a portion of the cross section that is different from a semicircle, a semi-elliptical, a parabolic and/or from a polygonal segment.

As already indicated above, in some embodiments of the pinch valve, the flow channel defines a longitudinal axis of the central closing region. In the cross section of the central closing region, this longitudinal axis accordingly defines an axis of symmetry. In such embodiments, the circumferential wall may in cross section include a plurality of points of reduced wall thickness at the position at which the force transmitting members, or the force transmitting member and the fixing member, are connected to the circumferential wall. Two points of this plurality of points may face one another, that is may be arranged opposite to one another with respect to the axis of symmetry.

As already indicated above, at the position where the force transmitting members, or the force transmitting member and the fixing member, are connected to the circumferential wall, the same may have a cross section with a central plane of mirror symmetry. In such embodiments, one or more force transmitting members may be designed to transmit the action of a force parallel to the plane of mirror symmetry or in the plane of mirror symmetry of the flow channel. This allows the circumferential wall to be deformable in such a way that its extent changes perpendicularly to the plane of mirror symmetry.

In some embodiments, a pinch valve according to the first aspect further includes a connecting member that is arranged at the inlet opening and/or at the outlet opening.

In a second aspect, a process for controlling the flow of fluid through a tube or a hose is provided. The tube or the hose contains a pinch valve according to the first aspect. The process includes, in the open state of the pinch valve, exerting a compressive force perpendicular to the flow direction of the flow channel to the pair of force transmitting members. The action of the compressive force reduces the distance of the force transmitting members from one another, thereby changing the shape of the cross section of the circumferential wall at the position at which the force transmitting members, or the force transmitting member and the fixing member, are connected to the circumferential wall. Thereby at least the area of the flow channel surrounded by the circumferential wall in cross section is reduced at this position. The process also includes, in the closed state of the pinch valve, reducing a compressive force acting on the pair of force transmitting members perpendicular to the direction of flow of the flow channel and/or allowing a tensile force to act on the pair of force-transmitting members perpendicular to the direction of flow of the flow channel. The reduced compressive force causes an increase in the distance between the force transmitting members and alters the shape of the cross section of the circumferential wall at the position where the force transmitting members or the force transmitting member and the fixing member are connected to the peripheral wall. As a result, in the cross section of the circumferential wall at the position where the force transmitting members, or the force transmitting member and the fixing member, are connected to the peripheral wall, inner surfaces of the circumferential wall which are in contact with one another move apart, i.e. away from one another. These inner surfaces of the circumferential wall move at least so far apart that the flow channel takes up an area that is different from zero. The flow channel is thereby released.

In some embodiments, in the process according to the second aspect, in the closed state of the pinch valve, a compressive force previously acting on one or more force transmitting member(s) is reduced to such an extent, or a tensile force is allowed to act perpendicular to the flow direction of the flow channel on one or more force transmitting member(s) with the tensile force being so strong, that the distance between the force transmitting members or the distance between the force transmitting member and the fixing member increases to such an extent that the pinch valve is completely converted into its open state.

In some embodiments, in the process according to the second aspect, in the closed state of the pinch valve, a compressive force previously acting on one or more force transmitting member(s) is terminated. Thereby, for example, a compressive force acting perpendicular to the flow direction of the flow channel on a first and on a second force transmitting member may be terminated. Thereby the distance of the force transmitting members from each other, or the distance between the force transmitting member and the fixing member, is increased and the consequences described above occur.

In some embodiments, in the process according to the second aspect, in the open state of the pinch valve a compressive force acting perpendicular to the flow direction of the flow channel on a force transmitting member, or on a first and a second force transmitting member, is increased. Thereby the distance of the force transmitting members from each other or the distance between the force transmitting member and the fixing member is reduced, and the consequences described above occur.

BRIEF DESCRIPTION OF THE DRAWINGS

FIGS. 1 to 7 and 9 to 14 depict engineering drawings, so that for the exemplary embodiments shown the relationships of dimensions to each other can be taken from the figures. The dimensions shown in FIG. 8 also essentially correspond to the conditions of an actual embodiment.

FIG. 1 depicts a pinch valve 1 as disclosed herein with a valve body 4, connecting members 2 in the form of hose adapters with connected hoses 3 and a housing 5, 15. Force transmitting tappets 11 are arranged in the housing 5, 15 with which force transmitting members 19, 19' containing bores 8 can be coupled and which are arranged in a central closing region 18. The housing contains a lock 14, is coupled to a housing locking device 6 and contains clearances 12, 13 for fixing the connecting members 2. The hoses 3 have a circumferential wall 31 and they enclose a flow channel 20, as do the connecting members 2 and the valve body 4.

FIG. 2 shows in perspective an embodiment of a valve body 4 of a pinch valve as disclosed herein, which contains an inlet opening 24 with a connecting element 2a abutting thereon and an outlet opening 25 with a connecting element 2a abutting thereon. In the central closing region 18, the force transmitting members 19, 19' containing bores 8 are connected to the circumferential wall 21 which surrounds the flow channel 20.

FIG. 3 shows in longitudinal section an embodiment of a valve body 4 of a pinch valve disclosed herein, which is designed for the connection of connecting members. The section is taken along the plane B-B indicated in FIG. 2. In the central closing region 18, a virtual plane A-A is indicated at the position of the force transmitting members 19, 19' containing bores 8.

FIG. 4 depicts a cross section 30 of the valve body 4 shown in FIG. 2 in the virtual plane A-A, which extends through the bores 8 with force transmitting members 19, 19' containing inner walls 32. Broken lines indicate the outline of the connecting member 2 behind the same as well as the outline of the circumferential wall of the hose 3 attached to it. At this position, the cross section contains a vertically running plane of mirror symmetry 17, a horizontally running plane of mirror symmetry 10 and a central axis of symmetry 7. In cross section, the circumferential wall 21 of the flow channel 20 includes two opposite linear sections 23 with linear inner surfaces 29 of the wall as well as two points of reduced wall thickness 9.

FIG. 5A is an exploded view of components of a pinch valve 1 disclosed herein in the form of a valve body 4 with force transmitting members 19 and connecting members 2. Also shown are hoses 3 to be connected. FIG. 5B shows the same exploded view in cross-section. The section is taken along the plane D-D indicated in FIG. 6.

FIG. 6 schematically shows the outlines of valve body 4, connecting member 2 and the indicated end of hose 3 relative to the virtual level D-D of the cross-section of FIG. 5B.

FIG. 7 depicts a perspective explosion view of the valve body 4 with force transmitting members 19, 19' and the connecting members 2 as well as the hoses to be connected of the embodiment of FIG. 5 of a pinch valve 1 disclosed herein.

FIG. 9 shows in longitudinal section the embodiment of the pinch valve 1 shown in FIG. 1 with valve body 4, connecting members 2 and connected hoses 3 as well as the housing 5, 15. The housing contains an interlock 14 and is coupled to a housing locking device 6.

FIG. 10 shows a side view of a housing locking device 6 with a valve body 4 coupled thereto and an open housing 5, 15. It can clearly be seen that a part of the housing 15 is fixed to the housing locking device 6, while a part of the housing 5 is movably connected to the fixed housing portion 15 by means of a hinge 35.

FIG. 11B depicts the same embodiment of a valve body 4 as FIG. 11A from a different perspective. The action of a compressive or tensile force on the force transmitting members 19 is indicated. FIG. 11C symbolizes, on the basis of the cross section 30 of an embodiment of a valve body 4 as disclosed herein, the action of a compressive or tensile force at the position at which force transmitting members 19 are connected to the circumferential wall 21, symbolized by double arrows. The section is taken along the plane E-E indicated in FIG. 11B. The respective force acts on the force transmitting members 19, 19', typically in or against the direction of the central axis of symmetry 7. If the position of the force transmitting members 19, 19' changes, the orientations of the linear sections 23 of the circumferential wall 21, including the inner surfaces 29 thereof, shift by way of a change of the respective angles on the force transmitting members 19, 19', assisted by the points of reduced wall thickness 9. As a result, thereby the area may change that is taken up by the flow channel 20 in the cross section 30.

FIG. 12 depicts, in perspective view, the pinch valve 1 shown in FIG. 1, wherein the interconnected members valve body 4, connecting members 2 and connected hoses 3 are arranged in the portion of the housing 15 to which the housing locking device 6 is connected. The housing is open so that a portion 5 of the housing which is movable via a hinge 35 is not in contact with the connecting members 2.

FIG. 13B depicts the valve body in cross section 30 at the position at which force transmitting members 19, 19' are connected to the circumferential wall 21. The cross section has a central axis of symmetry 7 and a plane of mirror symmetry 17 as well. The section is taken along the plane F-F indicated in FIG. 14A. FIG. 13A depicts the same embodiment in perspective view. This embodiment includes force transmitting members 19, 19' containing bores 8, and points of reduced wall thickness 9 allowing flexibility, which abut on linear sections 23 of the circumferential wall 21. In addition, the circumferential wall 21 is provided with projections 22.

FIG. 14 depicts a further embodiment of a valve body, namely in cross section 30 at the position at which a force transmitting member 19 and a fixing member 26 are connected to the circumferential wall 21. Upon action upon the force transmitting member 19 containing a bore 8, linear sections 23 of the circumferential wall 21 of different lengths are moved relative to one another, while the position of the fixing member 26 remains unchanged. Thereby the relative position in respect of the hose 3, indicated by broken lines, is changed. Points of reduced wall thickness 9 facilitate changing the shape of the cross section 30.

FIG. 15B is a cross-section along the plane G-G of the perspective view of the same embodiment shown in FIG. 15A. FIG. 15E is a cross-section along the plane H-H of the perspective view of the same embodiment shown in FIG. 15D. A further perspective view of the same embodiment, taken from a different perspective, is depicted in FIG. 15C. In FIG. 15B, a horizontal plane of mirror symmetry 10, which is arranged at the same distance between the force transmitting members 19, 19', remains at an unchanged position (i) in respect of a hose 3 indicated by broken lines. The force transmitting members 19, 19' move along a linear path by the same amount (ii). The projections 22 also move towards each other or away from each other by the same amount. In FIG. 15E, the horizontal plane of mirror symmetry 10 moves in relation to a hose 3 along a linear path (iii). One force transmitting member 19' of the two force transmitting members 19, 19' arranged opposite to each other remains in an unchanged position (i) in respect of the hose 3, when a force acts on the other force transmitting member 19. The other force transmitting member 19 moves in respect of the hose 3 along a linear path (iv) by a larger amount than the horizontal plane of mirror symmetry. The projections 22 above the horizontal plane of mirror symmetry 10 shift in respect of the hose 3 by a larger amount than the projections 22 below the horizontal plane of mirror symmetry.

DETAILED DESCRIPTION

Figure 1:
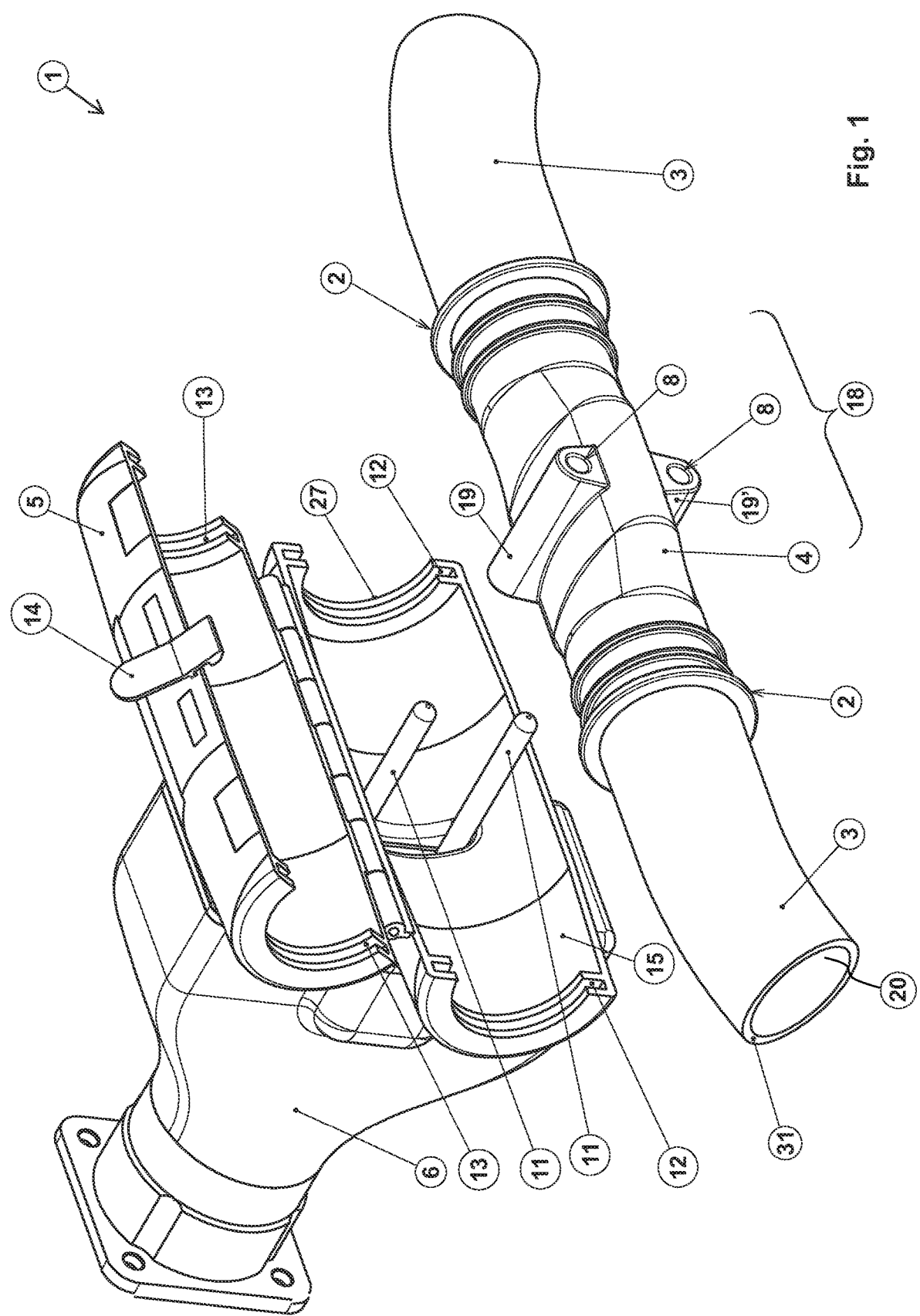

Unless otherwise defined, the following terms and expressions, when used in this document, including description and patent claims, have the meanings set forth below.

The term "consisting of" as used in this document means inclusive and limited to what follows the term "consisting of". The term "consisting of" thus indicates that listed elements are necessary or required and that no further elements may be present. The term "essentially consisting of" is understood to mean that it includes any element defined after the expression and that other elements, such as a sample or a composition, may be present which do not alter, i.e. do not affect or contribute to, the activity or effect indicated for the elements concerned in this document. In other words, the term "essentially consisting of" indicates that the defined elements are necessary or required, but that other elements are optional and may or may not be present, depending on whether or not they are relevant to the effect or effectiveness of the defined elements.

The term "one-piece" refers to an embodiment in which several elements, for example two elements, are structurally integrated in one part in such a way that the respective elements are united by an essentially inseparable connection. The respective elements may contain different materials or consist of different materials.

The word "about" as used herein refers to a value being within an acceptable error range for the particular value as determined by one of ordinary skill in the art. This will depend in part on how the value is measured or determined, i.e., the limitations of the measurement system. For example, "about" can mean within one, or more than one standard deviation, per the practice in the art. The term "about" is also used to indicate that the amount or value in question may be the value designated or some other value that is approximately the same. The phrase is intended to convey that similar values promote equivalent results or effects according to the invention. In this context "about" may refer to a range above and/or below of up to 10%. The word "about" refers in some embodiments to a range above and below a certain value that is up to 5%, such as up to 2% above or below that value. In some embodiments, "about" refers to a range of up to 1% above and/or below a certain value. In some embodiments, "about" refers to a range of up to 0.5% above and/or below a certain value. In one embodiment, about" refers to a range of up to 0.1% above and/or below a certain value.

The terms "top", "bottom", "vertical" and "horizontal" refer to an orientation of a pinch valve disclosed herein as a whole as typically encountered in its use in a process for controlling fluid flow through a tube or hose in accordance with the independent process claim. The orientation of the valve body is typically determined by the coupling or fixing of the force transmitting members to force transmitting devices and/or, where applicable, by the orientation of the punch. FIGS. 4, 8, 11, 13 and 14 show views of a cross section of a pinch valve, the orientation of which can define the terms "vertical" and "horizontal" in such a way that in the form as shown they are aligned horizontally parallel to the plane of the sea level and vertically parallel to the plane of the force of gravity.

The conjunctional expression "and/or" between several elements, when used herein, is understood to encompass both individual and combined options. For example, if two elements are linked by "and/or", a first option concerns the use of the first element without the second one. A second option concerns the use of the second element without the first element. A third option concerns the use of the first and second elements together. It is understood that any of these options falls within the meaning of the term and thus meets the conditions of the term "and/or" as used in this document.

Singular forms such as "a", "an" or "the" include the plural form when used in this document. Thus, for example, reference to a "cell" includes a single cell as well as a plurality of cells. In some cases, the term "one or more" is used explicitly to indicate that the singular form includes the plural form. Such explicit indications do not limit the general meaning of the singular form. Unless otherwise indicated, the term "at least" preceding a series of elements is to be understood to refer to every element in the series. The terms "at least one" and "at least one of" include for example, one, two, three, four or more elements.

A pinch valve disclosed herein includes an inlet opening and an outlet opening, which are generally arranged at different ends of the pinch valve. The inlet and outlet openings allow the flow of a liquid or gaseous medium through a flow channel that extends through the pinch valve. The flow channel is surrounded by a circumferential peripheral wall. This circumferential wall may be made of a uniform material over the entire length of the pinch valve. In some embodiments, the circumferential wall may contain different material at different positions along the flow channel.

The material of a force transmitting member and the material of a fixing member is selected independently of the material of any other existing force transmitting members that may be present and of the material of any other fixing members that may be present. In some embodiments, a force transmitting member contains a material that is also present in another force transmitting member and/or in a fixing member. In some embodiments, the material of a force transmitting member is identical to the material present in another force transmitting member and/or in a fixing member. In some embodiments, the material of a force transmitting member is entirely different from the material present in another force transmitting member and/or in a fixing member. The material of a force transmitting member and the material of a fixing member is furthermore selected independently of the material of the circumferential wall. In some embodiments, a force transmitting member contains a material that is also present in the circumferential wall. In some embodiments, a fixing member contains a material that is also present in the circumferential wall. In some embodiments, a force transmitting member and/or a fixing member is made of the same material as the circumferential wall. In some embodiments, a force transmitting member is made of a material that is completely different from the material(s) that the circumferential wall consists of. In some embodiments, a fixing member is made of a material that is completely different from the material(s) that the circumferential wall consists of.

In some embodiments, a force transmitting member and/or a fixing member is made of a single material or mixture of materials. In some embodiments, a force transmitting member and/or a fixing member contains a plurality of materials. As an illustrative example, a force transmitting member may consist of a first portion, for example a core, and a second portion, for example a casing. The material of the first portion and the material of the second portion may be selected independently of each other. For example, a core of a force transmitting member may consist of metal and be surrounded by a casing that consists of one or more polymer plastics.

The pinch valve includes a valve body, which also contains an inlet opening and an outlet opening. The inlet opening and the outlet opening of the valve body are arranged at different ends of the valve body. Typically, the inlet opening and the outlet opening of the valve body are also arranged at different ends of the pinch valve. The flow channel, which also extends through the central closing region (cf. below), may define a longitudinal axis of the pinch valve. At the inlet opening and at the outlet opening the flow channel may have any profile in cross section. If a tube or hose is to be connected, the cross section of the respective inlet opening and/or outlet opening may, for example, be circular.

As already indicated above, the flow channel is surrounded by a circumferential peripheral wall. This circumferential wall may be made of a uniform material over the entire length of the valve body. The circumferential wall is in some embodiments made of an elastic or yielding material over the length of the valve body. In some embodiments, the circumferential wall may only be made of an elastic material over the length where the flow channel is arranged in a central closing region of the valve body. In some embodiments, the circumferential wall may include areas or segments that contain an elastic material or consist thereof. The circumferential wall may also contain areas or segments that do not contain any elastic material. The areas or segments with an elastic material may then, for example, at least in the central closing region be arranged in such a way that the circumferential wall as a whole shows yielding or flexible properties.

Examples of a suitable elastic or yielding material include silicone and a thermoplastic elastomer such as a thermoplastic polyester elastomer, a thermoplastic copolyester, a thermoplastic copolyamide, an olefin-based thermoplastic elastomer, a styrene block copolymer or an urethane-based thermoplastic elastomer. Examples of a suitable material having at least essentially no elastic or yielding properties are polybutylene terephthalate, a polyamide, polypropylene or polycarbonate.

As an illustrative example, a force transmitting member or a plurality of force transmitting members may consist of material which does not have elastic properties. If present, also a fixing member may consist of material which has no elastic properties. A respective material may be polybutylene terephthalate. In addition, the valve body may consist of material which has no elastic properties in the essential regions, i.e. in regions which make up 80% or more of the circumferential wall, such as 90% of the circumferential wall. In the central closing area there may be one or more hinges or one or more segments included, which consist(s) of material that has elastic or yielding properties, such as silicone.

As a further illustrative example, force transmitting members that are present and one or more fixing members, where present, may consist of material or a mixture of materials which has/have no elastic properties, such as polybutylene terephthalate. In addition, the remaining valve body may, in the central closing region, at least essentially consist of an elastic or yielding material or an elastic or yielding mixture of materials, such as a thermoplastic elastomer. In embodiments in which the remaining valve body in the central closing region at least essentially consists of an elastic or yielding material, or of an elastic or yielding mixture of materials, the valve body may in the central closing region furthermore contain elements of a material that has no elastic properties. Such non-elastic elements may serve in maintaining the shape of the valve body, for example in the form of a support cage or an endoskeleton.

As a further illustrative example, in the central closing region the valve body may in cross section consist of two integral halves or of two halves that are integrally formed but distinguishable with regard to materials. In the central closing region, one half of the valve body may consist of a material or a mixture of materials that has little or no elastic properties, such as polypropylene. The other half of the valve body may consist of a material or a mixture of materials that has elastic or yielding properties, such as a thermoplastic elastomer. In such embodiments, one or more force transmitting members and, if present, one or more fixing members may be made of material having comparable or the same elastic properties as the corresponding region of the circumferential wall of the valve body to which they are connected. Two corresponding halves of the valve body may be provided as an upper and a lower half or, in some embodiments, may be taken to define an upper and a lower half. The lower half is the portion of the valve body which is in operation intended to face the influence of gravity, that is to be oriented in the direction toward which gravity acts. The upper half is the portion of the valve body that faces in the opposite direction in a corresponding orientation. The lower half of the central closing region may for example consist of a material or mixture of materials that has little or no elastic properties, such as polypropylene. The upper half of the valve body may consist of a material or mixture of materials that has elastic or yielding properties, such as a thermoplastic elastomer.

The circumferential wall is thus yielding or flexible to external forces, at least in a central closing region, without the integrity of the circumferential wall being affected. The circumferential wall may also be yielding or flexible to external forces over the entire length of the valve body without the integrity of the circumferential wall being affected.

In some embodiments, the shape of the cross section of the flow channel of the valve body changes starting from the inlet opening and/or the outlet opening up to a position where the force transmitting members, or the force transmitting member and the fixing member, are connected to the circumferential wall. At this position, the cross section of the flow channel includes at least two linear sections. In some embodiments, the shape of the flow channel profile of the valve body in cross section changes over a central portion of the valve body, which is positioned between the inlet opening and the outlet opening. Such a central portion of the valve body is also referred to herein as the central closing region. This central closing region includes the position where the force transmitting members, or the force transmitting member and the fixing member, are connected to the circumferential wall of the flow channel. The central closing region is characterized by the fact that the circumferential wall of the flow channel in its cross section encloses an area along its entire length in the central closing region, the size of which area is at least essentially uniform across the entire central closing region.

In some embodiments, the central closing region may extend over about a quarter to over 90% of the entire length of the flow channel in the valve body. In some embodiments, the central closing region may extend over about one third to about 80% of the total length of the flow channel in the valve body.

In the central closing region, the circumferential wall (the peripheral wall) of the flow channel also has a cross-sectional shape that is different from circular shape. However, any shape other than a circular shape is basically suitable for the shape of the cross section of the flow channel. Typically, the cross section of the circumferential wall has in the central closing region a shape that includes one or more linear sections. The cross section may for example have the shape of a polygon such as a triangle or a quadrilateral. A respective quadrilateral may for example be a square or a rectangle. As a further example, the cross section may have the shape of a regular, i.e. convex, trapezoid, such as the shape of an isosceles trapezoid. The cross section may also have the shape of a hexagon, such as a regular hexagon. The cross section may also have the shape of a heptagon, for example the shape of a flat, regular heptagon.

The force transmitting members are generally elements that are firmly connected to the circumferential wall of the flow channel in the central closing region. They may be provided one-piece as an integrally formed part of the circumferential wall. A force transmitting member may, in some embodiments, include portions or segments that contain or consist of a material that is particularly resistant to the stress caused by compressive or tensile forces. Other portions or segments of the force transmitting member may contain a material different therefrom. Where there is a plurality of force transmitting member present, in some embodiments one of the force transmitting members may contain portions or segments containing or consisting of a material that is particularly resistant to the stress caused by compressive or tensile forces. In some embodiments, all force transmitting members present may contain portions or segments which contain or consist of a material which is particularly resistant to the stress caused by compressive or tensile forces.

A force transmitting member is capable of exerting a compressive or tensile force on the circumferential wall of the flow channel. An example of a force transmitting member is a male form such as a punch. Such a punch may be integrated into the circumferential wall or releasably coupled to the same. In the latter case, one surface of the punch is generally in contact with one surface of the circumferential wall, and pressing down or lifting the punch leads to a corresponding lowering or raising of the contacted surface of the circumferential wall of the flow channel. Since the circumferential wall of the flow channel is made of elastic material, a change of the shape of the cross section of the circumferential wall of the flow channel results therefrom. The material of the circumferential wall may consist of a more elastic material or contain a more elastic material than a force transmitting member that is connected to the circumferential wall.

In the case of two opposing punches, arranged in parallel, a compressive force that acts on one of the punches or on both punches, acts in the direction of the opposite stamp, respectively. Accordingly, a tensile force on one or both punches acts against the direction of the opposite punch. If a force acts on one or two opposing punches, the cross section of the flow channel is compressed or extended. The opposing punches and thus the corresponding opposing wall surfaces of the cross section of the flow channel move in such a way that each point of one of the opposing surfaces moves by the same distance relative to the opposite surface. The two punches and the corresponding wall sections thus remain arranged in parallel.

If a compressive force acts only on one of two punches that are arranged opposite one another with respect to a plane of mirror symmetry, the punch exposed to the force can move unilaterally towards the opposite punch. Relative to an external observer, in this case the punch not exposed to a force, may appear as a fixed element, while the shape of the remaining cross section of the circumferential wall changes and, in particular, the opposite punch is moved in its position.

In the case of two opposing punches, arranged in parallel, the cross section of the circumferential wall at the position at which the punches are connected to the circumferential wall may contain a plane of mirror symmetry centrally arranged between the two opposing punches. If a compressive force acts only on one of two punches that are arranged opposite one another with respect to a plane of mirror symmetry, the punch exposed to the force can move unilaterally in the direction of the plane of mirror symmetry, for an external observer thereby shifting the plane of mirror symmetry in the direction of the opposite punch. The plane of mirror symmetry itself generally shifts in the direction of the other punch. If a compressive force of the same amount acts on two punches arranged opposite to each other in relation to a plane of mirror symmetry, for an external observer the punches can move towards each other without the plane of mirror symmetry shifting. If compressive forces of different magnitude act on two punches that are arranged opposite one another with respect to a plane of mirror symmetry, for an external observer all elements/members of the cross section of the circumferential wall can change and, in particular, the mirror plane can also shift. In such a case, generally all elements/members of the cross section are also moved with respect to other elements/members of the pinch valve, such as connecting members, tubes or a housing. For an observer on, for example, one of the stamps or the mirror plane, all three cases are indistinguishable from one another.

Force transmitting members defined by coupling members for force transmitting devices, for example coupling members containing a bore, a web, a lug or a groove, may be arranged on opposite sides of plane of mirror symmetry. In embodiments with a force transmitting member and a fixing member, the force transmitting member and the fixing member may be arranged on opposite sides of a plane of mirror symmetry.

If the plane of mirror symmetry is in such a case oriented horizontally, a compressive force acting on one or two force transmitting members of two opposing transmitting force members may act in the direction of this plane of mirror symmetry, as in the above example of a punch. Accordingly, in embodiments with a force transmitting element and a fixing member, a compressive force acting on the force transmitting member may act in the direction of the plane of mirror symmetry. Similarly, a tensile force acting on one or two force transmitting members of two opposing force transmitting members, or, in embodiments with a force transmitting member and a fixing member, acting on the force transmitting member, may act against the direction of the opposing force transmitting member or the fixing member, respectively. In the event that two corresponding force transmitting members are opposite each other with respect to the plane of mirror symmetry, a compressive force may act in the direction of the opposite force transmitting member. In such a case, a tensile force acting on one or both of the transmitting members may also act in the opposite direction to that of the opposite force transmitting member. Accordingly, a compressive force or a tensile force may act in the direction of an opposite fixing member or against the direction of an opposite fixing member. The preceding explanations apply mutatis mutandis to punches opposing each other.

Force transmitting members that are defined by coupling members for force transmitting devices may, for example, also be arranged opposing one another in respect of an axis of symmetry. In such a case, a compressive force acting on one or two force transmitting members of two opposingly arranged force transmitting members may act respectively in the direction of the opposite force transmitting member—relative to the axis of symmetry. Likewise, a tensile force acting on one or two force transmitting members of two opposingly arranged force transmitting members may act against the direction of the opposite force transmitting member. The direction of such a force may in some cases be a vertical direction. In some embodiments, the direction of such a force may be different from a vertical direction. If a force acts on one or two force transmitting members arranged opposing each other in relation to the axis of symmetry, the cross section of the flow channel is compressed or expanded. If the force transmitting members are each positioned at a point at which two linear sections of the circumferential wall abut on both sides, the angle at which these linear sections of the cross section are aligned with one another is typically altered when a force is exerted. Exposure to a tensile force may for example cause this angle to be reduced. Exposure to a compressive force may for example cause the angle at which these two linear sections are aligned to be increased. The arrangement of linear sections of the cross section of the flow channel relative to one another is thus changed. If, in such cases, compressive forces or tensile forces of equal magnitude act on force transmitting members that are opposingly arranged with respect to an axis of symmetry, the absolute arrangement of the axis of symmetry in space may in some cases remain unchanged. In particular, if different force transmitting members are exposed to different compressive or tensile forces, for example if compressive or tensile forces act only on some of a plurality of force transmitting members, the absolute arrangement of the axis of symmetry may shift in space. For example, an axis of symmetry may shift in a vertical direction.

Irrespective of the forces acting, in some embodiments the relative arrangement of the symmetry axis with respect to, for example, the force transmitting members may only change in that the distances between the force transmitting members and the symmetry axis change. The same applies in the case of a force transmitting member being arranged opposite to a fixing member.

Typically, sections of the circumferential wall that are more linear are defined by respective surfaces of the flow channel that are aligned with one another in such a way that they abut one another in a closed state of the valve body, that is they are in contact with one another over the entire surface. The cross sectional shape of the valve body in the central closing region is selected in such a way that in a closed state of the valve body, in which the flow channel is completely compressed, at the position at which the force transmitting members, or the force transmitting member and the fixing member, are connected to the circumferential wall, at any point in cross section the same compressive force is exerted on the material of the circumferential wall via the mechanism, and the cross section is completely closed. In this way, the valve can completely interrupt the flow also when operating pressure is applied.

A force transmitting member of the valve body may be movable along any chosen path against another force transmitting member or against a fixing member. In some embodiments, a force transmitting member of the valve body is movable along a linear path against another force transmitting member or against a fixing member. In some embodiments, a force transmitting member of the valve body is movable along a zigzagged path against another force transmitting member or against a fixing member. In some embodiments, a force transmitting member may be movable along a curved path, for example a path with a constant curvature, against another force transmitting member or against a fixing member. In some embodiments, a force transmitting member may be movable along a path with a changing curvature, for example a path with a continuously increasing curvature, against another force transmitting member or against a fixing member.

In embodiments in which a first and a second force transmitting member are connected to the circumferential wall in the central closing region, these force transmitting members may be movable against each other along any chosen path. In some embodiments, the force transmitting members of the valve body are movable against each other along a linear path. In some embodiments, the force transmitting members are movable against each other along a zigzagged path. In some embodiments, the force transmitting members are movable along an arcuate path, for example a path with a constant curvature.

In some embodiments, a valve body of a pinch valve disclosed herein includes a fixing member. A fixing member ensures that a position of the valve body is maintained when a force is exerted on a force transmitting member. A fixing member can therefore be taken to be an element for a counterforce in the sense of the law of action and reaction according to Newton. Against this background, it becomes clear that a fixing member is not required if more than one force transmitting member is connected to the circumferential wall. In this respect, a fixing member differs from a force transmitting member in that it does not have to be able to transmit a force to the circumferential wall. However, it needs to be able to resist a force that is exerted on the circumferential wall to the extent that the position of the circumferential wall is not essentially altered by the force exerted. A fixing member does therefore, for example, not have to be couplable to a force-transmitting device, for example via a positive, form-locking or a non-positive, friction-type connection. A fixing member only needs to be couplable to, or connected to, any fixed position outside the valve body. This could be, for example, a housing of the pinch valve.

Therefore, a fixing member is arranged at least essentially perpendicular to the flow direction of the flow channel. In the cross section of the circumferential wall, at the position at which the fixing member and one or more force transmitting members are connected to the circumferential wall, a fixing member may be arranged at any angle to a force transmitting member. In some embodiments, in cross section a fixing member and a force transmitting member are arranged opposite each other. A fixing member may in principle have any shape as long as it is suitable for providing sufficient resistance to a force exerted on the circumferential wall by a force transmitting member. In some embodiments, a fixing member may be defined by a component of the housing wall of the pinch valve.

A fixing member may be connected to the circumferential wall at a position or a portion of the cross section of the circumferential wall, at which also a force transmitting member may be connected to the circumferential wall, cf. the preceding explanations. For example, a fixing member may be connected to a portion of the cross section of the circumferential wall that defines a corner thereof, for example the corner of a polygon. For example, it may be a corner of an n-sided segment, where n is a number from 3 to 12, for example a number from 3 to 8 or a number from 4 to 6.

In retrospective view, it should be clearly apparent to a person skilled in the art that the control behavior of conventional pinch valves is not optimal due to the geometry and the change in geometry during the closing process as well as because of the tube tolerances. A noticeable flow change when squeezing a hose occurs only from about 25% of the total distance before the closing point. Only this short distance is the actual range that can be used for control with a conventional pinch valve. Due to this short distance, however, the valve must be able to move very small position steps without causing the control path to vibrate. However, position detection is again limited in terms of its accuracy, for example by the resolution of the path measuring system or by clearance among the mechanical parts, which lead to hysteresis.

In contrast, diaphragm control valves that have been commercially available to date are characterized by better control behavior. However, diaphragm control valves usually require a kind of saddle or a comparable element in the passage zone on which the diaphragm seals in the closed state. This leads to a non-optimal flow behavior in the passage zone and to strong shear forces. Shear forces are particularly undesirable in the production of biopharmaceuticals and in particular in the production of peptides and proteins, since the target molecule could be damaged in the course of the process. Due to the geometry of diaphragm control valves, undesirable pressure drops even occur in an open state, which renders their use in certain biopharmaceutical processes more difficult.

In contrast thereto, a pinch valve disclosed herein includes a valve body that avoids these disadvantages of conventional diaphragm control valves and hose pinch valves.

A pinch valve with a valve body as described herein allows avoiding flow losses due to deflections and thus in particular avoiding the occurrence of shear forces. For example, destruction of biological cells contained in the medium by shear forces can be avoided. In this way, a gentle transport of a liquid medium in the presence of the pinch valve is possible. The construction of the valve body disclosed herein also allows avoiding the occurrence of dead space areas as a result of undercuts or abrupt transitions.

In cross section, the circumferential wall of the flow channel surrounds an area that defines the interior of the flow channel in cross section. In a valve body of a pinch valve disclosed herein, this area is essentially constant over the entire valve body. In typical embodiments, this area is constant over the entire valve body. As explained above, the shape that defines the cross section of the circumferential wall may differ at different positions along the entire valve body. For instance, in the central closing region the cross section of the circumferential wall has a shape that is different from the circular shape. At the inlet opening and/or at the outlet opening, the cross section of the circumferential wall has a shape that is selected independently of the shape that the cross section of the circumferential wall has in the central closing region. In some embodiments, the cross section of the circumferential wall at the inlet opening and/or at the outlet opening is different from the shape in the central closing region. The cross section of the circumferential wall at the inlet opening or at the outlet opening may for example be circular. The cross section of the circumferential wall may be circular at both the inlet opening and at the outlet opening. In all such embodiments, however, the area defined by the cross section of the circumferential wall is typically the same at all positions along the entire valve body.

With a non-compressible fluid in a pipe, the volume flow or the flow rate in the interior of the flow channel is the same at all positions along the pipe, so that there is also a uniform volume flow along the valve body. The volumetric flow rate (or volume velocity) indicates which volume of a fluid passes through a specific cross section in a unit of time. It is usually specified in the SI unit $m^3/s$ (cubic meters per second). The volume flow is proportional to the averaged flow velocity of a pipe flow and is the product of the averaged flow velocity over a resulting flow cross section and the area of this cross section at the relevant position. The average flow velocity needs to be used as a basis, since the cross-sectional flow profile cannot be the same at every distance from the circumferential wall.

Since the area of the flow channel in a pinch valve as disclosed herein is at least essentially constant over the entire valve body, the mean flow velocity along the flow channel is also at least essentially constant throughout the entire valve body. In typical embodiments, the mean flow velocity along the flow channel is constant over the entire valve body.

The pinch valve, including e.g. the valve body, as well as its use are explained here in more detail by means of the figures and examples shown and discussed in the following. It should be noted that the figures and examples are only descriptive in nature and are not intended to restrict the underlying invention in any way.

With reference to the appended figures, in one embodiment the valve body may be closed and/or opened by two force transmitting members that are arranged opposing each other with respect to the direction of flow in the flow channel. Such an embodiment is shown in FIGS. 1, 3 to 7, 9, 10 and 12. A respective embodiment is also shown in FIG. 2. In this case, the force transmitting members 19 each contain a bore 8 into which a force-transmitting device 11 in the form of a bolt of a housing closing device 6 is insertable. As can be taken from this example, a backlash-free coupling of force transmitting member and force transmitting device 11 is possible and embodiments with an easily pluggable matching force transmitting device 11 can allow simple handling.

As shown in the figures, for example, a conventional hose with a circular cross section may be connected to the pinch valve. A connecting member 2 or a connecting element 2*a* of the valve body shown in FIG. 2 may also contain a flow channel of circular cross-sectional profile. As can be taken from FIG. 1, in typical embodiments the circumferential wall 21 of the flow channel 20 in the central closing region 18 of the valve body 4 is designed in such a way that along the direction of flow from the inlet opening 24 or the outlet opening 25 in the direction of the plane A-A depicted in FIG. 3, over a defined distance the cross section of the circumferential wall 21 is approaching the cross section 30 in a stepless manner at the position at which the force transmitting members 19, 19' are connected to the circumferential wall. The cross section of the circumferential wall at this position is labelled in the figures by reference numeral 30.

In the embodiment shown in FIGS. 1, 3 to 7, 9, 10 and 12, in the fully open state the cross section 30 has a circular area that corresponds to the circular area of the cross section of the connected hose. In the open state, a deflection-free flow profile is thus possible in a pinch valve disclosed herein. In this state, liquid flowing through is not exposed to any change of the flow channel, when passing through the valve body. The same applies mutatis mutandis to a gas flowing through. Thus, there does not need to be at least essentially any influence on the flow, especially no reduction of the flow.

The wall thickness of the valve body may change along the flow direction from the inlet and/or outlet opening to the central closing region, for example in a stepless form. In this way it is possible to contribute to ensuring that in the central closing region the largest deformations occur when the pinch valve is opened and closed.

Figure 4:
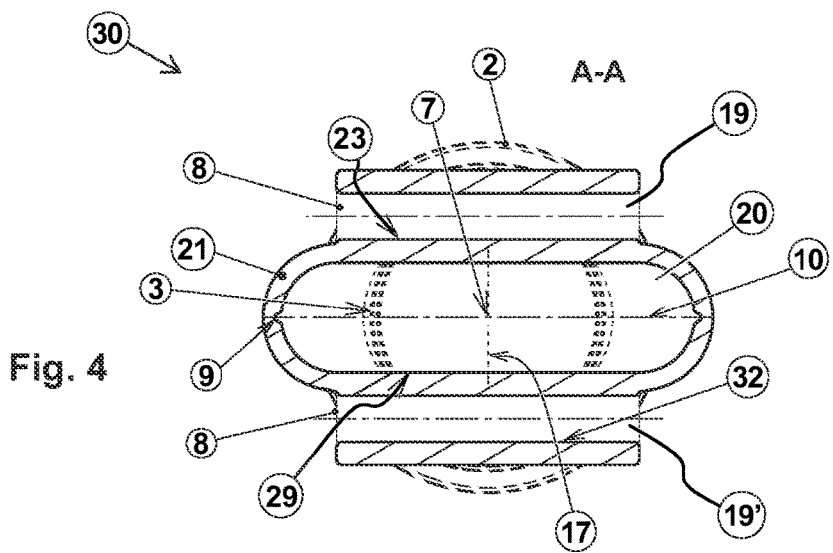
Figure 7:
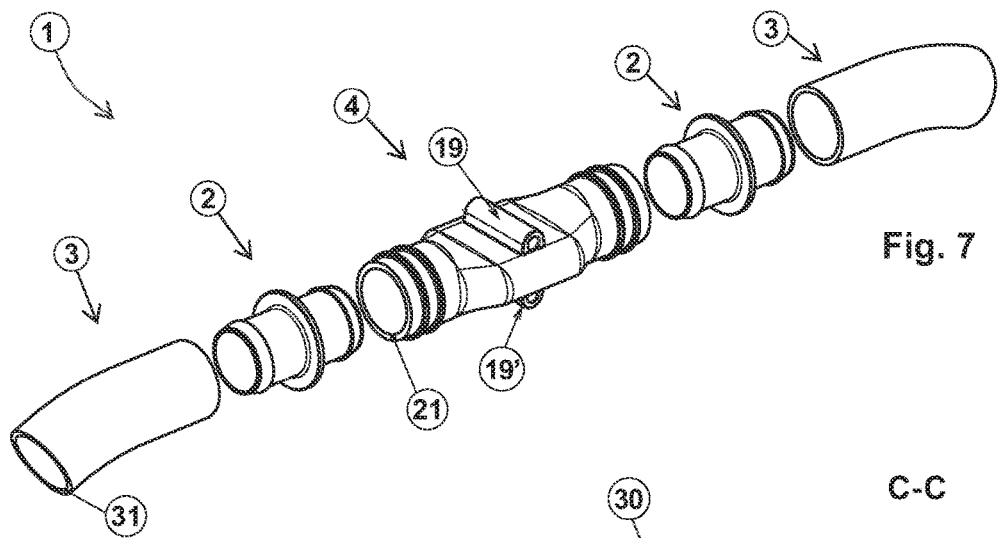

In embodiments such as those shown in FIG. 2 or FIG. 7, the power transmitting members 19, 19' may be taken to be a stiffening of the circumferential wall 21. Depending on the design of the circumferential wall 21 in the region of the cross section 30, in the fully open state a force transmitting member 19, 19' may extend over any proportion of the maximum extent of the cross section 30. For example, as shown in FIG. 4, a force transmitting member 19, 19' may extend over about 70% or more of the maximum extent of the cross section 30. In other embodiments, a force transmitting member 19, 19' may extend over a substantially smaller proportion of the maximum extent of the cross section 30, for example about 40% or less.

Figure 2:
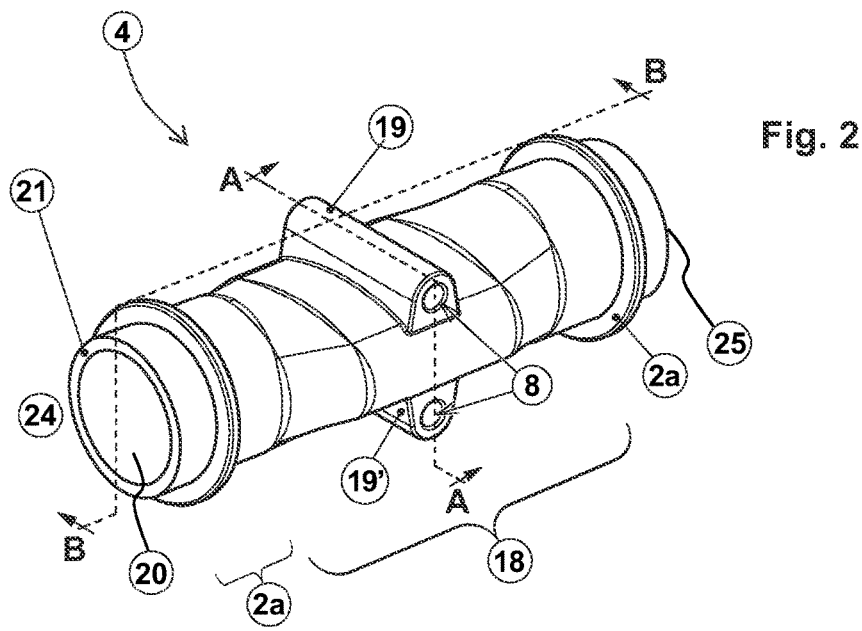
Figure 3:
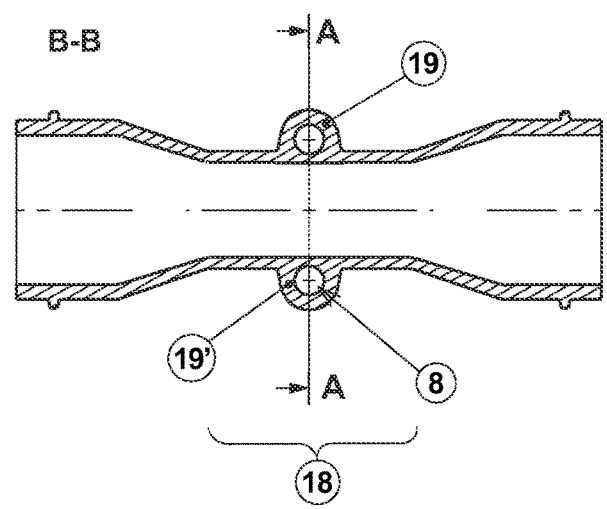

As can be understood from e.g. FIG. 3, a compressive or tensile force can be exerted by means of bolts 11 pushed into the bores 8 of the force transmitting members 19, 19', cf. e.g. FIG. 1. The bolts 11 and thus the linear sections 23 of the circumferential wall 21 move parallel to one another. If the bolts 11 are moved towards or away from each other, they compress or expand the circumferential wall 21 in cross section. As a result, the linear sections 23 of the circumferential wall move towards one another or away from one another. The non-linear areas of the circumferential wall are thereby stretched or compressed.

The circumferential wall may contain points and/or segments of reduced wall thickness that are more resilient or flexible than the surrounding areas of the circumferential wall due to the smaller wall thickness. They may for example be points or segments similar to a bellows or in the form of an integrated film hinge. In addition, the circumferential wall may contain a material of higher deformability or elasticity in non-linear areas of the circumferential wall when compared to the linear areas thereof. The areas made of a more deformable/elastic material may also be areas of thinner wall thickness. In the embodiment shown in FIG. 4 there are for example points of reduced wall thickness 9 included.

The circumferential wall may also include points and/or segments of increased wall thickness that are less resilient or flexible than the surrounding areas of the circumferential wall due to the increased wall thickness. For example, at positions where a load or a bending of the circumferential wall is to be avoided, the likelihood of deformation can be reduced by increasing the wall thickness. In the cross section this may be the case, for example, in linear areas of the circumferential wall. In addition, the circumferential wall may in respective areas contain a material of higher stiffness than, for example, in the non-linear areas of the circumferential wall. Areas of higher wall thicknesses may additionally be made of a material with higher stiffness.

The points and/or segments of reduced wall thickness may contribute to the fact that when a compressive or tensile force is exerted on a force transmitting member 19, 19' in the central closing region 18, a largely linear deformation of the circumferential wall 21 along the direction of flow occurs. As far as this deformation extends to the inlet opening and to the outlet opening, a corresponding linear deformation of the circumferential wall will continue there.

As explained above, the material of a force transmitting member 19, 19' is selected independently of the material of the circumferential wall. The material of a fixing member 26 is also selected independently of the material of the circumferential wall 21. A suitable choice of different materials can, where applicable, contribute to a largely linear deformation of the circumferential wall 21 on the one hand, and to avoiding undesirable other deformations of elements of the pinch valve on the other hand.

The bolts 11 may thus cause the circumferential wall to be compressed in cross section 30 to such an extent that the flow channel 20 does not take up any area in cross section. The bolts 11 may also cause a corresponding state in which the pinch valve is closed to be opened. The compression or expansion may occur in such a way that the two opposingly arranged linear sections 23 of the circumferential wall, which may be taken to be pressure surfaces, move symmetrically towards one another along the axis of symmetry 7. Likewise, only one of the linear sections 23 can move along the axis of symmetry 7 to the opposite section 23.

Figure 8A:
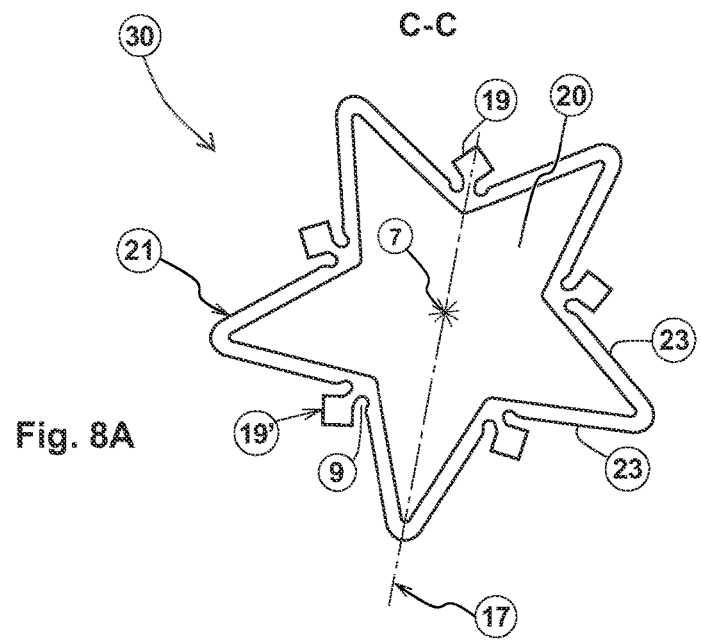
FIG. 8A shows a cross section 30 of an embodiment of a valve body 4 disclosed herein at the position at which force transmitting members 19, 19' are connected to the circumferential wall 21. The circumferential wall in cross section has the shape of a pentagon and includes a plane of mirror symmetry 17 and a central axis of symmetry 7. Points of reduced wall thickness 9 abut on the force transmitting members 19, 19' and on linear sections 23 of the circumferential wall 21. The section is taken along the plane C-C indicated in FIG. 8B.
Figure 8B:
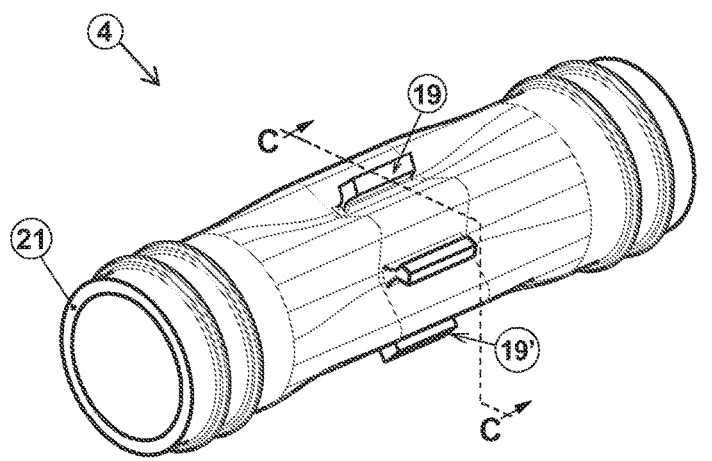
FIG. 8B shows a perspective view of the valve body 4 depicted in FIG. 8A.
Figure 9:
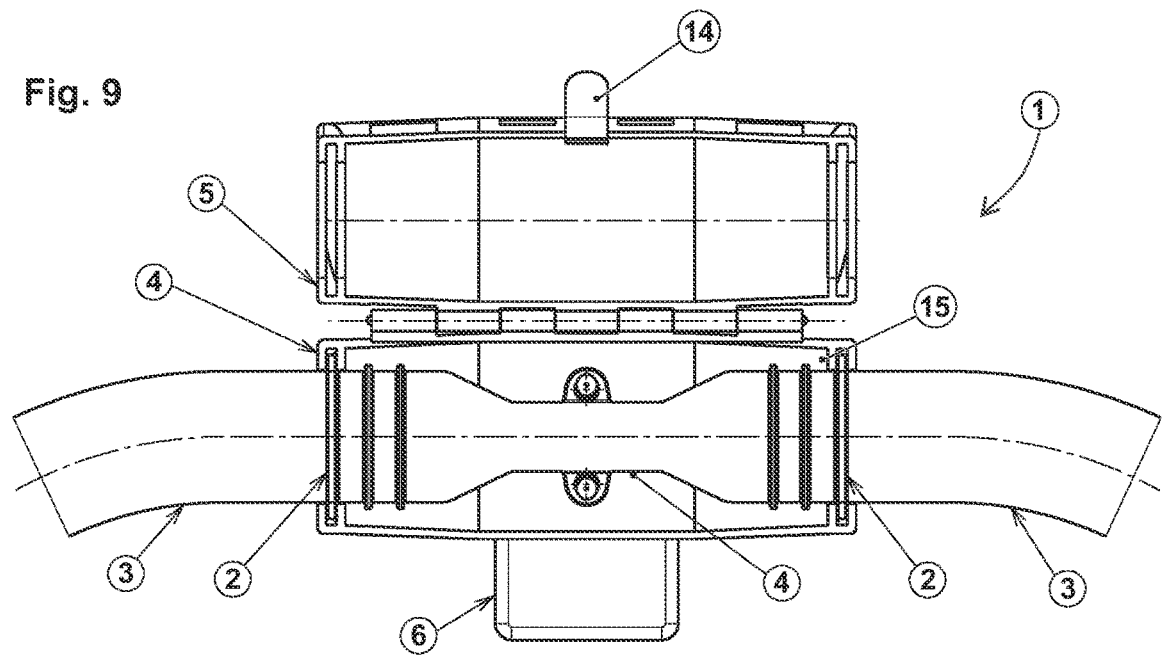
Figure 10:
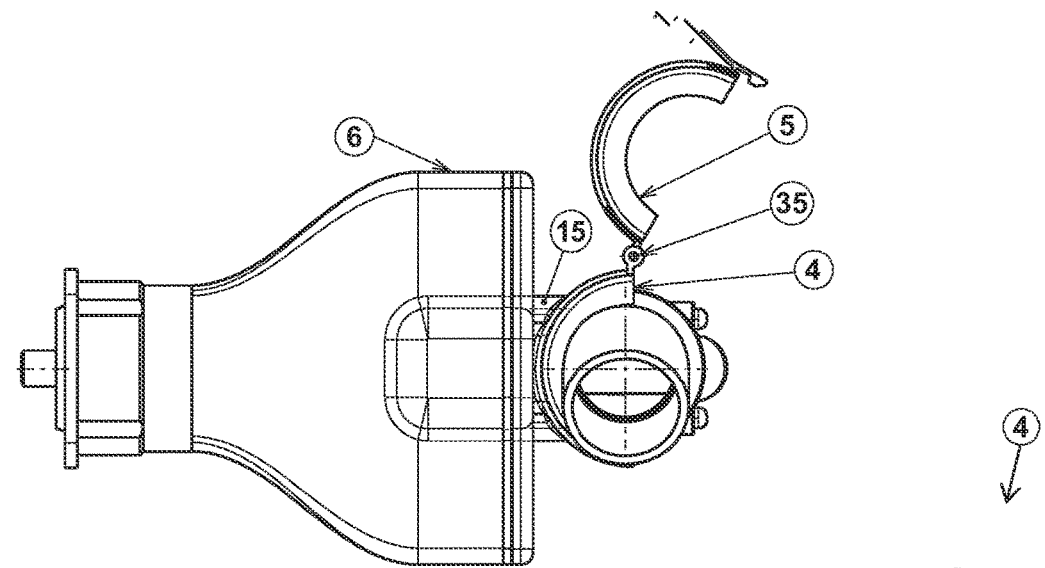
Figure 11A:
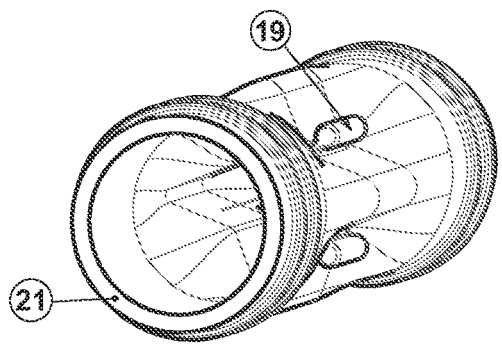
FIG. 11A depicts in perspective view a further embodiment of a valve body 4 with force transmitting members 19 connected to the circumferential wall 21.

In addition to the embodiment with a bore 8 shown in e.g. FIG. 2, a force transmitting member 19, 19' may have any design which allows to coupling to a correspondingly shaped force transmitting device 11. In some embodiments, a force transmitting member 19, 19' may include a web with a specific geometric profile that is for example couplable to a groove in a force transmitting device 11. As an example, a force transmitting member 19, 19' may have a T-profile or an I-profile. In some embodiments, a force transmitting member 19, 19' may have a hammer-shaped profile or a fir-tree-shaped profile. In some embodiments, a force transmitting member 19, 19' in the form of a tab may be couplable to the force-transmitting device 11. FIG. 8 shows an example of a force transmitting member 19 which is quadrangular in cross section and is connected at one corner to the circumferential wall 21. FIG. 11 shows an example of a force transmitting member 19 which is circular in cross section and which can be received by a corresponding groove or recess in the force transmitting device 11.

In the embodiments shown in FIG. 8 and FIG. 11, the force transmitting members 19, 19' are arranged between adjacent linear sections 23 of the circumferential wall 21. The action of a tensile or compressive force causes the force transmitting members 19, 19' to move away from the axis of symmetry 7 of the cross section 30 or towards the same. As a result, the angles between the linear sections 23 of the circumferential wall at the position of the force transmitting members 19, 19' are increased or decreased. In typical embodiments of such embodiments, a force transmitting device 11 is coupled to a force transmitting member 19, 19' in such a way that a force acts largely precisely in the direction of the symmetry axis 7 or in the opposite direction.

Figure 13A:
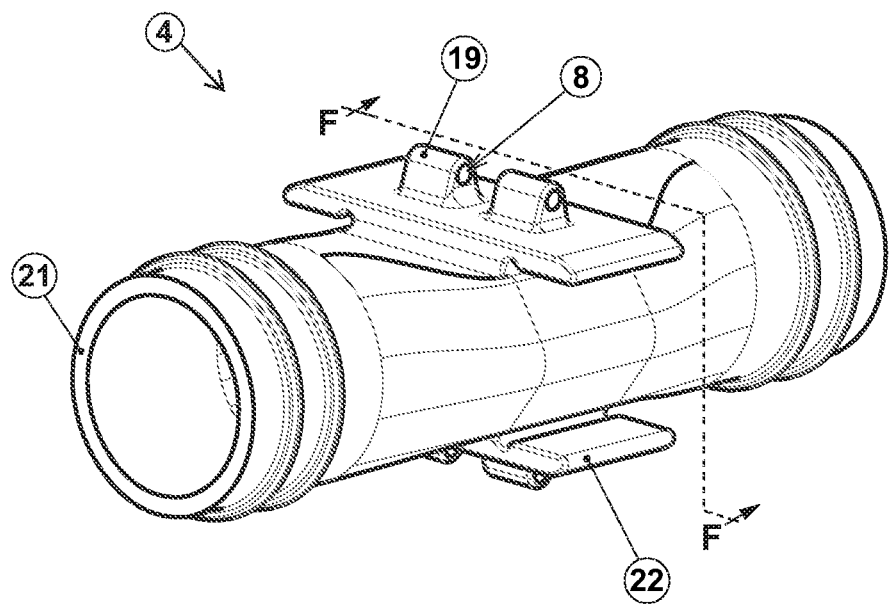
FIG. 13A and FIG. 13B depict a further embodiment of a valve body 4.
Figure 13B:
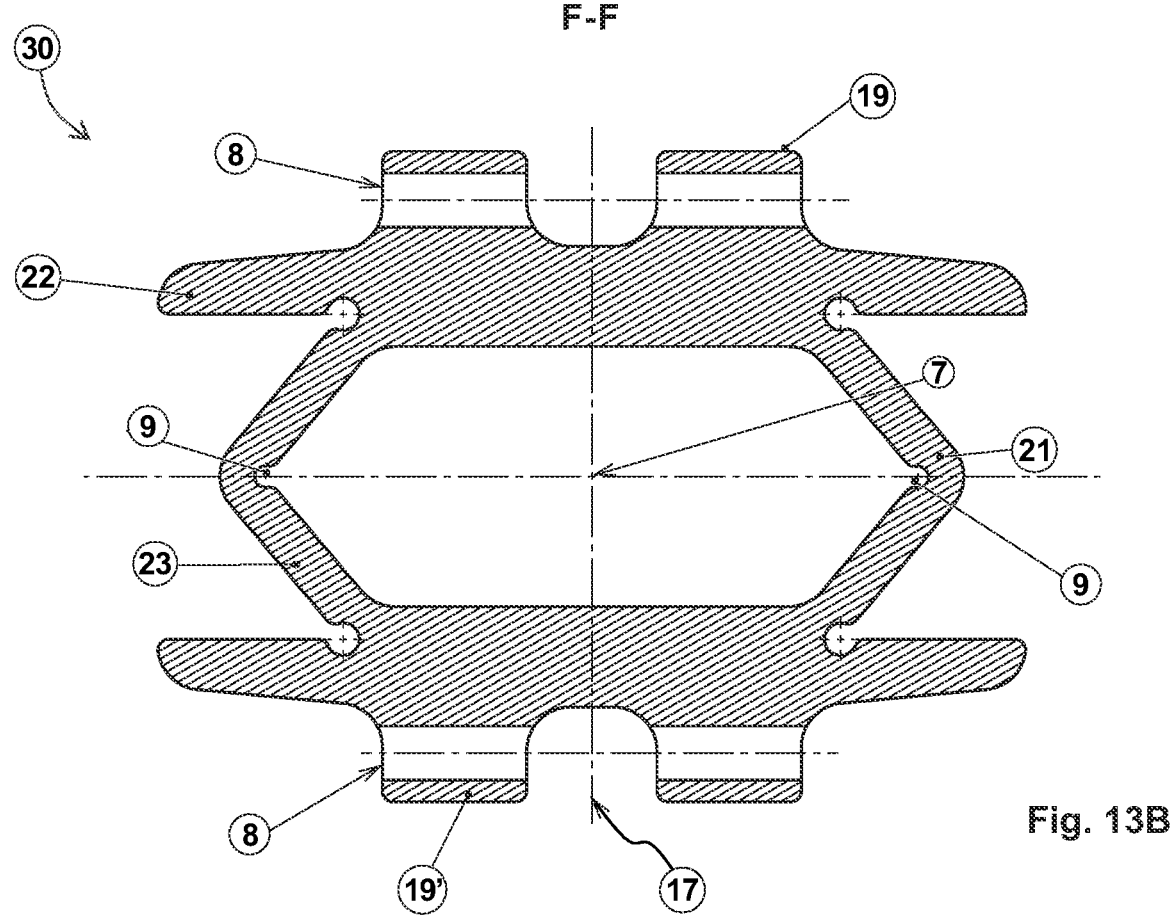
Figure 14:
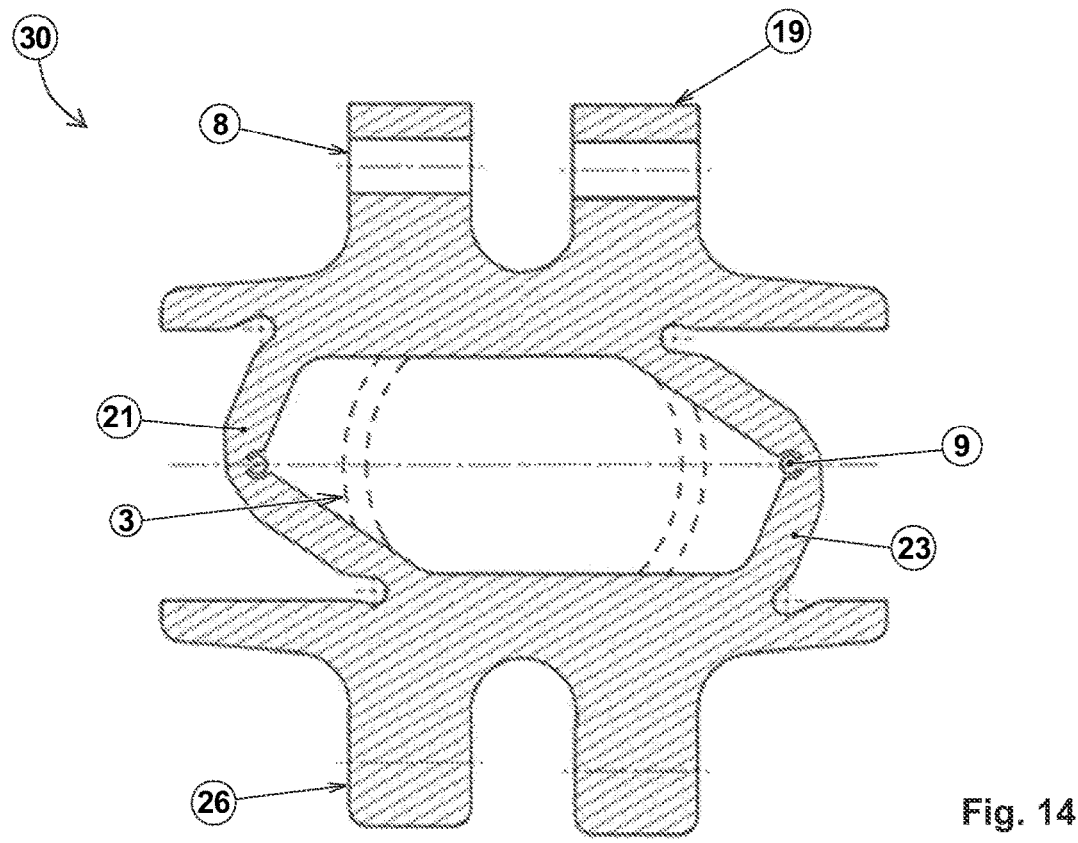

FIG. 13 and FIG. 14 show embodiments in which force transmitting members (19 or 19 and 19'), which contain bores 8, are in a central closing region 18 connected to a circumferential wall 21 which in cross section have the shape of a polygon—in this case the shape of a hexagon that is different from a regular hexagon. The hexagon in FIG. 14 has three pairs of sides of the same length, whereas the hexagon in FIG. 14 includes one pair of opposite sides of the same length as well as four further sides of the same length.

As shown in FIG. 13, FIG. 14 and FIG. 15, some embodiments of the circumferential wall may include protrusions or edge pieces 22 extending away from the flow channel, parallel to the axis of the bore 8, at one end of the cross section of the circumferential wall. This end of the cross section may typically be a segment in which a force transmitting member 19 is connected to the circumferential wall. These protrusions 22 may contribute to allow a force from a force transmitting device to act uniformly on the circumferential wall of the flow channel. These protrusions 22 may, for example, also provide a guide for wall portions that laterally push outwards between the force transmitting members when a deformation of the circumferential wall occurs upon exertion of a compressive force by a force transmitting member 19 onto the opposite force transmitting member 19'.

FIG. 14 furthermore shows a simple example of a fixing member 26. In this case, the fixing member 26 resembles in design the force transmitting member 19, but it does not contain any bores 8 and therefore cannot accommodate a bolt 11. As already explained above, the design of the fixing member may be independent of the design of any force transmitting member that may be present.

FIG. 15 illustrates an up or down stroke that moves one or two opposingly arranged force transmitting members 19, 19'. FIG. 15A illustrates the case where two equally large forces act on the two opposingly arranged force transmitting members 19, 19'. These forces may be tensile forces, symbolized by arrows pointing outwards, or compressive forces, symbolized by arrows pointing inwards. As illustrated by the indicated hose 3, the planes in which the bores 8 are located are for example moved by the same distance in the direction of a central horizontal plane of symmetry 10. The latter remains in the same position.

Figure 15A:
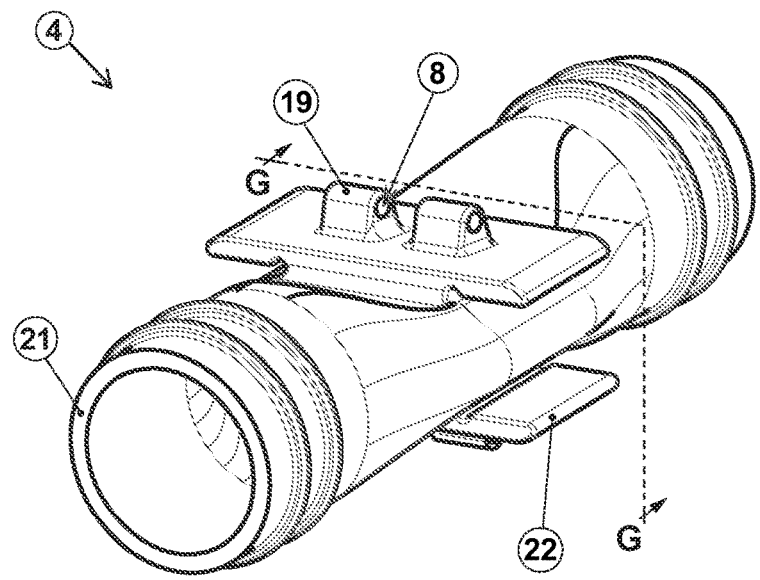
FIG. 15B and FIG. 15E illustrate in cross section 30 at the position at which force transmitting members 19, 19' are connected to the circumferential wall 21, the action of an equally large compressive or tensile force on two force transmitting members 19, 19' arranged opposite to each other (A), and the action of a force on only one force transmitting member 19 of two force transmitting members 19, 19' that are arranged opposite to each other (B).
Figure 15B:
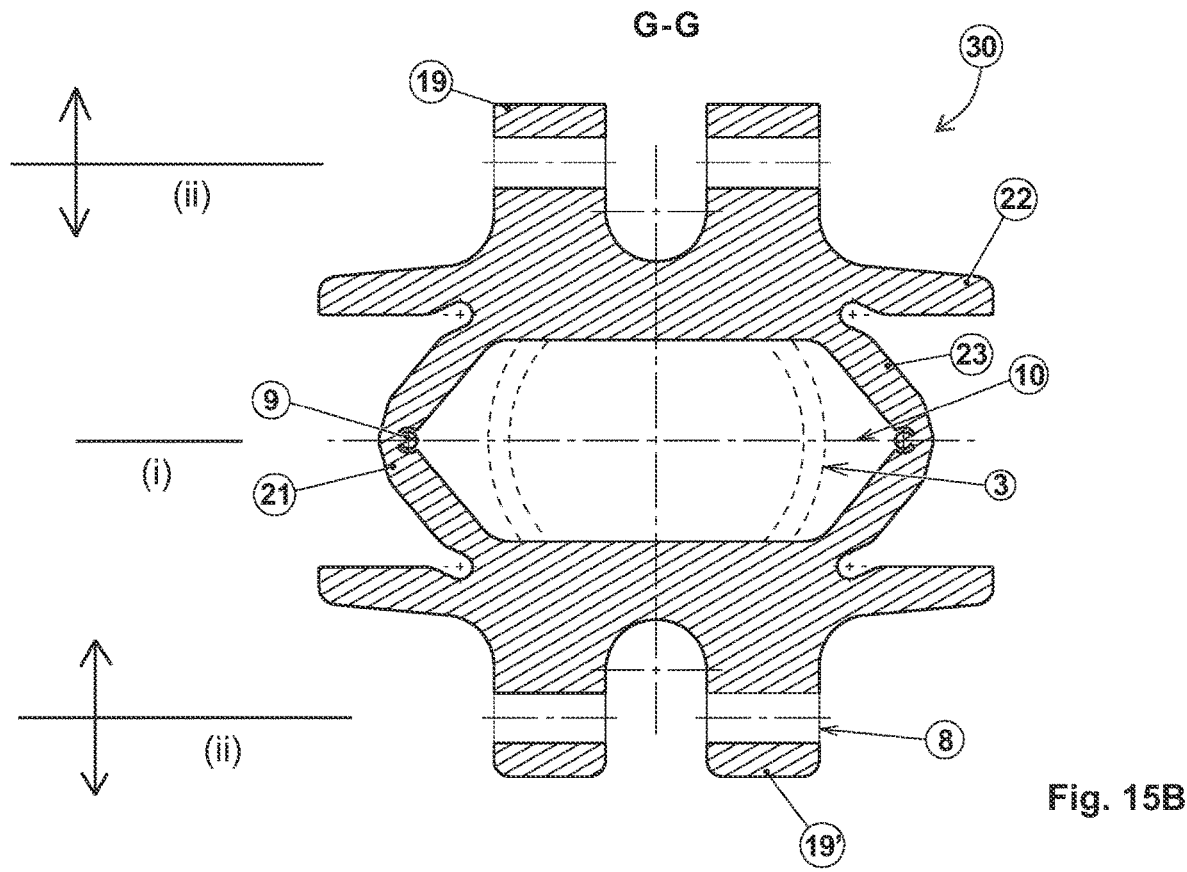
Figure 15C:
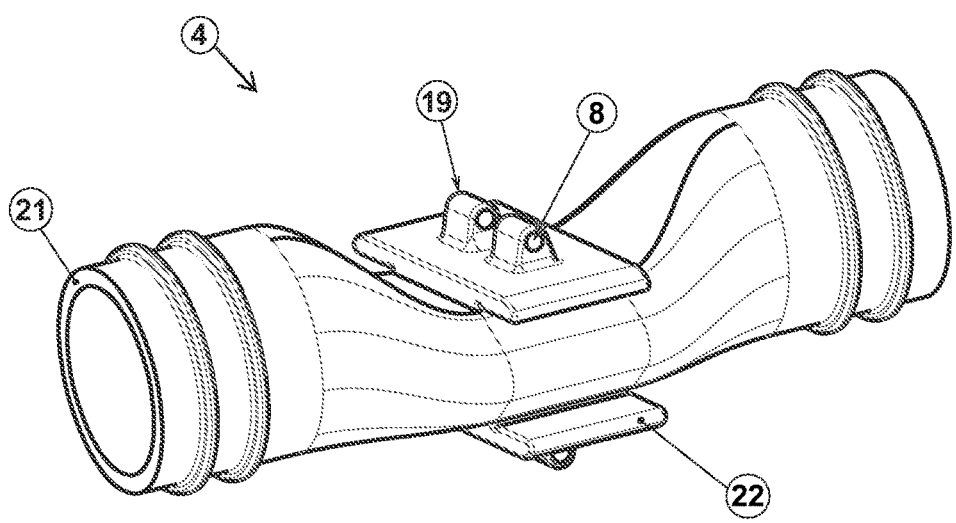
Figure 15D:
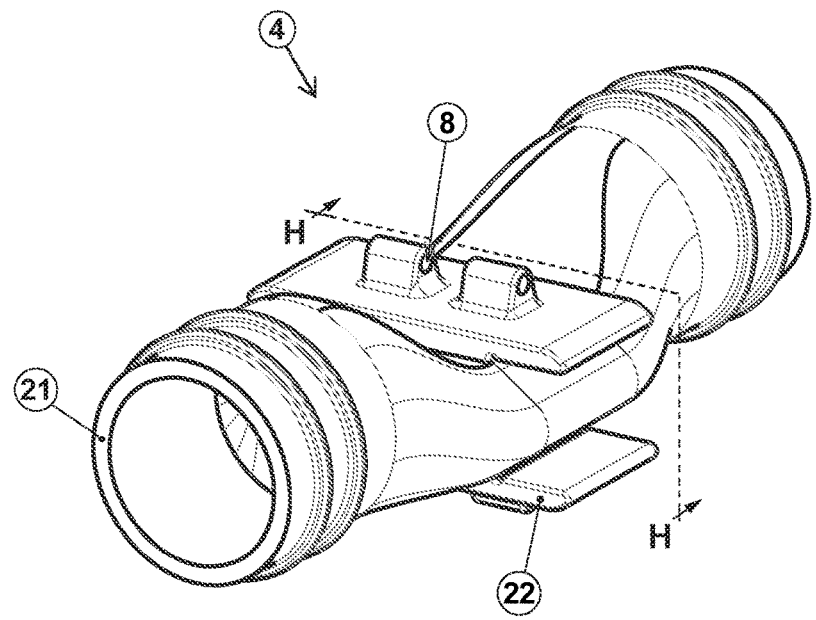
Figure 15E:
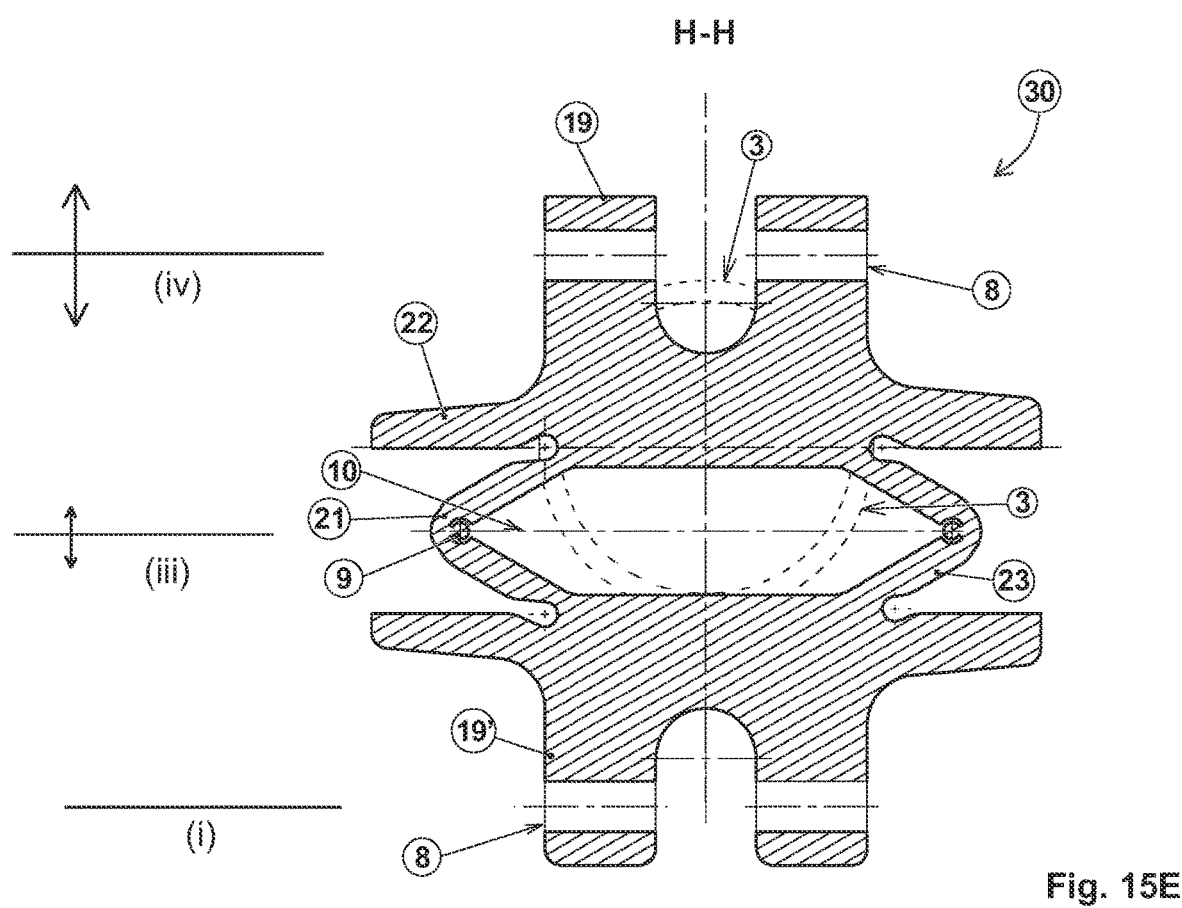

FIG. 15B illustrates the case where a force acts solely on the first force transmitting member 19. The second force transmitting member 19' may also be replaced by a fixing member. In this case, the lower plane in which the bores 8 of the second power transmitting member 19' are located, remains in an unchanged position with respect to the indicated hose 3. In contrast thereto, the plane 10, which represents a central horizontal plane of symmetry, undergoes a slight stroke with respect to the indicated hose 3. A stronger stroke occurs in the plane in which the bores 8 of the first force transmitting member 19 are located.

In addition to the valve body 4, the pinch valve may include one or two connecting member(s) 2. As can for example be taken from FIG. 5, the valve body 4 may be releasably connected to the connecting member 2. It may for example be a hose olive. In some embodiments, such as shown in FIG. 2, the valve body 4 may include connecting elements 2a at its ends for connecting e.g. a hose. As shown in FIG. 1, a connecting member 2 or a connecting element 2a may allow and/or facilitate positioning of the valve body 4 within a housing 5, 15. Using a releasably coupled and thus possibly interchangeable connecting member 2 may allow a particular freedom of choice with regard to the shape and dimensioning of a housing. In addition, using a releasable connecting member 2 can contribute to allowing positioning the valve body 4 in a way that ensures an arrangement of the valve body 4 and the force transmitting device 11, in which the movement of a force transmitting device 11, and thereby of a force transmitting member 19, runs perpendicular to the direction of flow. This allows closing and opening movements to be as perpendicular to the flow axis as possible.

Positioning the valve body 4 as well as a hose connected thereto, and possibly a connecting member 2, within a housing 5, 15 can also contribute to an arrangement that ensures that the movement of a force transmitting device 11, and thereby of a force transmitting member 19, is perpendicular to the direction of flow.

The connecting member 2 or the connecting element 2a is typically detachably connected to the tube or the hose 3. These individual components may, for example, be connectable by plugging together. Once the individual components are connected to one another, the respective connections may additionally be secured using techniques known to those skilled in the art, for example using a cable tie or a hose clamp.

As already stated above, a valve body that is connected to one or two connecting members and that is further coupled to a tube or hose, may be arranged in a housing. In the embodiment shown in FIGS. 3 to 7, the valve body 4 may be arranged together with connected connecting member 2 and a hose 3 in a closable housing 5, 15 as shown in FIG. 1. When inserting connected valve body 4, connecting members 2 and hose 3, in this embodiment the valve body 4 with the bores 8 is pushed onto the bolts 11. Furthermore, the connecting members 2 are inserted in the frankings 12 of the fixed part of the housing 15. As already indicated above, the centering of the connecting members 2 in the fixed housing 15 contributes to ensuring a flow perpendicular to the closing and opening plane, and to fixing the hose unit to the system. If the housing is closed by folding the freely movable housing portion 5 around the pinch valve, the pinch valve is completely fixed in space. The hose olives as connecting members 2 are half-enclosed by the franking 13 of the movable housing portion 5 and the two housing portions 5, 15 are locked together by the snap hook 14.

The contents of scientific articles, patents and patent applications and the contents of all other documents and electronically accessible data mentioned or cited herein are hereby incorporated by reference in their entirety to the same extent as if each individual publication were expressly and individually referred to as incorporated by reference. In the event of an objection, this document is the deciding factor. The applicant reserves the right to physically incorporate into this document any and all material and data from any such articles, patents and patent applications or other physical and/or electronic documents.

The listing or discussion of a previously published document in this specification should not necessarily be taken as an acknowledgement that the document is part of the state of the art or is common general knowledge.

The pinch valve and its use illustratively described herein may suitably be practiced in the absence of any element or elements, limitation or limitations, not specifically disclosed herein. Additionally, the terms and expressions employed herein have been used as terms of description and not of limitation, and there is no intention in the use of such terms and expressions of excluding any equivalents of the features shown and described or portions thereof. It is recognized that various modifications are possible within the scope of the invention claimed. Thus, it should be understood that although the present invention has been specifically disclosed by exemplary embodiments and optional features, modification and variation of the inventions embodied therein herein disclosed may be resorted to by those skilled in the art, and that such modifications and variations are considered to be within the scope of this invention.

It should therefore be understood that a valve body and its use, e.g. in a process, which have been described in sufficient detail herein and been illustrated by means of certain specific embodiments so that they can be carried out by those skilled in the art, should not be limited thereto; rather, modifications and variations of the described embodiments are considered to be within the scope of the invention.

The invention has been described broadly and generically herein. Each of the narrower species and subgeneric groupings falling within the generic disclosure also form part of the invention. This includes the generic description of the invention with a proviso or negative limitation removing any subject matter from the genus, regardless of whether or not the excised material is specifically recited herein.

Other embodiments are within the appending claims. In addition, where features or aspects of the invention are described in terms of Markush groups, those skilled in the art will recognize that the invention is also thereby described in terms of any individual member or subgroup of members of the Markush group.

As an average person of skill in the field will readily appreciate on the basis of the present disclosure, other components, members or steps which currently exist or will be developed later and which essentially achieve the same result as the exemplary embodiments described herein may also be used in accordance with the present invention.

What is claimed is:

1. A pinch valve (1), comprising:
   a valve body (4) having exactly one flow channel (20), wherein the flow channel (20) is surrounded by a one-pieced circumferential wall (21) and comprises, at a first end, an inlet opening (24) adapted for connection of a first connecting member (2) or abutting a first connecting element (2a), and, at a second end, an outlet opening (25) designed for connection of a second connecting member (2) or abutting a second connecting element (2a), and first (19) and second (19') force transmitting members, or a force transmitting member (19) and a fixing member (26), being connected to the one-pieced circumferential wall (21) in a central closing region (18) and being integrally provided as part of the one-pieced circumferential wall, the central closing region (18) being arranged between the inlet opening and the outlet opening, wherein the first and the second force transmitting member (19, 19'), or the force transmitting member (19) and the fixing member (26), are arranged perpendicular to a flow direction of the flow channel (20), wherein the one-pieced circumferential wall (21) comprises an elastic material, such that the first and the second force transmission member (19), or the force transmission member (19) and the fixing member (26), are movable relative to one another when a force transmitting member (19) is exposed to a compressive or tensile force perpendicular to the flow direction of the flow channel (20), and wherein in an open state the circumferential wall (21) in the central closing region (18) has a cross section that is different from a circle, wherein absent any exposure to compressive or tensile force on one or more force transmitting members the pinch valve (1) is in the open state, and wherein, in the open state, the circumferential wall (21) comprises inner surfaces defining respective cross-sectional areas in planes perpendicular to the flow direction of the flow channel, wherein the respective cross-sectional areas are constant or essentially constant along the entire valve body (4), such that the mean flow velocity in the flow channel (20) is uniform or essentially uniform at all positions along the valve body (4).

2. The pinch valve of claim 1, wherein absent any exposure to compressive or tensile force the pinch valve (1) is in the open state and convertible into a closed state when exposed to compressive force, wherein in the closed state the inner surfaces (29) of the circumferential wall (21) contact each other in cross section (30) so completely, that the flow channel (20) is in cross section (30) completely closed.

3. The pinch valve of claim 2, wherein at the position at which the first and second force transmitting members (19, 19'), or a force transmitting member (19) and a fixing member (26), are connected to the circumferential wall (21), the circumferential wall (21) has a cross section (30) which comprises two sections that define inner surfaces (29) which at least substantially accurately fit to one another, wherein the at least substantially accurately fitting inner surfaces (29) are surface contactable with one another upon exposure of a force transmitting member (19) to a compressive force.

4. A process for controlling the flow of liquid through a tube or hose (3) containing a pinch valve (1) according to claim 2, the process comprising:

in the open state of the pinch valve (1), allowing exertion of a compressive force perpendicular to the flow direction of the flow channel (20) to a force transmitting member (19, 19'), such that the distance between the force transmitting members (19, 19') or the distance between the force transmitting member (19) and the fixing member (26) is reduced, and thereby the shape of the cross section (30) is altered, such that the respective cross-sectional areas defined by the inner surfaces of the circumferential wall in planes perpendicular to the flow direction of the flow channel are at least reduced, and in the closed state of the pinch valve (1), reducing a compressive force acting perpendicularly to the flow direction of the flow channel (20) on a force transmitting member (19, 19') or allowing a tensile force to act on a force transmitting member (19, 19') perpendicular to the flow direction of the flow channel (20), such that the distance between the force transmitting members (19, 19') or the distance between the force transmitting member (19) and the fixing member (26) increases and thereby alters the shape of the cross section (30), such that inner surfaces (29) of the circumferential wall (21), which are in cross section (30) in contact with one another, move apart at least to such an extent that the flow channel (20) takes up an area which is different from zero and is thereby released.

5. The process of claim 4, comprising in the closed state of the pinch valve (1), reducing said compressive force and allowing said tensile force to act on a force transmitting member (19, 19') perpendicular to the flow direction of the flow channel (20).

6. The pinch valve of claim 1, wherein the circumferential wall (21) at the position where the first and second force transmitting members (19, 19'), or a force transmitting member (19) and a fixing member (26), are connected to the circumferential wall (21) has a cross section (30) that includes at least two linear sections (23), wherein either a linear section (23) is an area, in which a force transmitting member (19, 19') or a fixing member (26) is connected to the circumferential wall (21) or two linear sections (23) abut from both sides on a point at which a force transmitting member (19, 19') or a fixing member (26) is connected to the circumferential wall (21).

7. The pinch valve of claim 1, wherein the cross section (30) of the circumferential wall (21) comprises at least one of
a) a central plane of mirror symmetry (17), and
b) an axis of symmetry (7), the axis of symmetry being defined in that the cross section (30) is, by a mental rotation through an angle of less than 360° around the axis of symmetry (7), transferrable into an arrangement which is indistinguishable from the initial position.

8. The pinch valve of claim 7, wherein one or more force transmitting members (19) is/are designed to transmit the action of a force parallel to the plane of mirror symmetry (17) or in the plane of mirror symmetry (17) of the flow channel (20) such that the circumferential wall (21) is deformed in such a way that its extent changes perpendicularly to the plane of mirror symmetry (17).

9. The pinch valve of claim 7, wherein the force transmitting members (19, 19') or the force transmitting member (19) and the fixing member (26) upon exposure of the force transmitting member (19) to a compressive or tensile force are at least one of
a) movable against one another parallel to the plane of mirror symmetry (17) or in the plane of mirror symmetry (17) and
b) movable in the direction towards the axis of symmetry (7) or away from the axis of symmetry (7).

10. The pinch valve of claim 1, wherein the circumferential wall (21) in cross section (30) comprises two or more points and/or segments of reduced wall thickness (9).

11. The pinch valve of claim 1, wherein each force transmitting member (19, 19') is independently couplable and/or fixable to a force transmitting device (11) via a form-locking or a friction-type connection, or is defined by a punch.

12. The pinch valve of claim 11, wherein a force transmitting member (19, 19') comprises a bore, a web or a groove.

13. The pinch valve of claim 1, wherein the flow channel (20) defines a longitudinal axis of the central closing region (18), which in cross section (30) defines an axis of symmetry (7).

14. The pinch valve of claim 13, wherein the circumferential wall (21) in cross section (30) comprises a plurality of points of reduced wall thickness (9) and wherein two of the plurality of points (9) are arranged opposite to one another with respect to the axis of symmetry (7).

15. The pinch valve of claim 1, wherein the cross section (30) of the circumferential wall (21) comprises at least one semicircular, one semi-elliptical, one parabolic or one polygonal segment.

* * * * *